(12) United States Patent
Isaji et al.

(10) Patent No.: US 9,043,088 B2
(45) Date of Patent: May 26, 2015

(54) VEHICLE BEHAVIOR CONTROL APPARATUS

(71) Applicant: Denso Corporation, Kariya, Aichi-pref. (JP)

(72) Inventors: Kazuyoshi Isaji, Kariya (JP); Naohiko Tsuru, Handa (JP); Shou Morikawa, Obu (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 13/870,167

(22) Filed: Apr. 25, 2013

(65) Prior Publication Data

US 2013/0304322 A1 Nov. 14, 2013

(30) Foreign Application Priority Data

Apr. 26, 2012 (JP) .................. 2012-101550

(51) Int. Cl.
*B60W 10/06* (2006.01)
*B60W 10/20* (2006.01)
*B62D 1/28* (2006.01)
*B62D 6/00* (2006.01)
*B62D 15/02* (2006.01)

(52) U.S. Cl.
CPC .............. *B62D 6/00* (2013.01); *B62D 15/025* (2013.01)

(58) Field of Classification Search
USPC ............. 701/1, 23, 36, 41, 49, 400, 408, 409, 701/410, 411, 466, 519, 532, 533, 300, 301, 701/302; 340/901, 903, 988, 995.14, 340/995.25, 995.28, 435
See application file for complete search history.

(56) References Cited

U.S. PATENT DOCUMENTS

| 5,878,362 | A * | 3/1999 | Sekine et al. ................. 701/41 |
| 6,169,940 | B1 * | 1/2001 | Jitsukata et al. .............. 701/23 |
| 2010/0082203 | A1 | 4/2010 | Isaji et al. |
| 2013/0131925 | A1 | 5/2013 | Isaji et al. |

FOREIGN PATENT DOCUMENTS

| JP | 11-034898 A | 2/1999 |
| JP | 2009-241870 A | 10/2009 |
| JP | 2010-018062 A | 1/2010 |
| JP | 4596063 B2 | 12/2010 |
| JP | 2013-126854 A | 6/2013 |

* cited by examiner

*Primary Examiner* — Thomas Tarcza
*Assistant Examiner* — Edward Pipala
(74) *Attorney, Agent, or Firm* — Posz Law Group, PLC

(57) ABSTRACT

A vehicle behavior control apparatus mounted in a vehicle to control steering of the vehicle. A virtual road outline, which is an outline of a drivable road region where the vehicle will travel, is determined on the basis of detection results from a location sensor. The virtual road outline is reconstructed as a sequence of road segments, such as straight road segments, and right- and left-hand curved road segments. When a current road segment where the vehicle is currently present is a right- or left-hand curved road segment, a subsequent road segment where the vehicle will be present subsequently is tentatively set to a straight road segment until the vehicle reaches the subsequent road segment. The steering angle is controlled so that a virtual-road boundary distance is adapted to a proper distance from the vehicle to a boundary of the virtual road outline situated in front of the vehicle.

15 Claims, 26 Drawing Sheets

VEHICLE BEHAVIOR CONTROL APPARATUS

CROSS-REFERENCE TO RELATED APPLICATION

This application is based on and claims the benefit of priority from earlier Japanese Patent Application No. 2012-101550 filed Apr. 26, 2012, the description of which is incorporated herein by reference.

BACKGROUND

1. Technical Field

The present invention relates to a vehicle behavior control apparatus that controls a steering angle.

2. Related Art

Known techniques acquire a curvature radius of a curve, along which a vehicle is turning, and control a steering angle of the vehicle by using the acquired curvature radius.

For example, Japanese Patent No. 4596063 discloses a technique such that the curvature radius of the curve on the road is calculated on the basis of first to third distances from the own vehicle to a road boundary or a road accessory in front of the own vehicle detected by a vehicle-mounted radar device. The first distance is a distance from the middle position of the front end of the own vehicle along the vehicle width direction to the road boundary or the road accessory. The second distance is a distance from the right edge of the front end of the own vehicle to the road boundary or the road accessory. The third distance is a distance from the left edge of the front end of the own vehicle to the road boundary or the road accessory. Further, in the disclosed technique, an optimal distance from the middle position of the front end of the own vehicle to the road boundary or the road accessory is calculated on the basis of the curvature radius of the curve. A steering angle of the own vehicle is controlled so that an actual distance from the middle position of the front end of the own vehicle to the road boundary or the road accessory is adapted to the calculated optimal distance. In the disclosed technique, the optimal distance is a distance from the middle position of the front end of the own vehicle to the road boundary or the road accessory when the own vehicle is traveling along a circular trajectory of the proper curvature radius in the curve on the road.

The technique disclosed in Japanese Patent No. 4596063, however, fails to automatically control the steering angle while smoothly changing the steering angle. This is true for the case of traveling along an alternate sequence of right- and left-hand curves (e.g., a right-hand curve->a left-hand curve->a right-hand curve-> . . . ) without a straight path therebetween.

In such a scenario, there is an inflection area on the road between each right- or left-hand curve and its subsequent left- or right-hand curve, where, for example, the boundary of the road situated in front of the own vehicle may change abruptly from an outer boundary of the right- or left-hand curve to an outer boundary of the left- or right-hand curve. Consequently, in each inflection area, an actual distance from the front end of the own vehicle to the road boundary in front of the own vehicle (referred to as an actual road boundary distance) may increase abruptly.

Since the optimal distance defined in Japanese Patent No. 4596063 is a distance from the front end of the own vehicle to the road boundary in front of the own vehicle when the own vehicle is traveling along a circular trajectory of the proper curvature radius of the curve, an optimal distance may not change abruptly in each inflection region while the own vehicle is traveling along the right- or light-hand curve.

The technique disclosed in Japanese Patent No. 4596063 is configured to control the steering angle so that the actual road boundary distance is adapted to the optimal distance. In each inflection region, however, since the actual road boundary distance may change abruptly without an abrupt change in optimal distance as described above, the steering angle may be controlled to change abruptly.

In consideration of the foregoing, it would therefore be desirable to have a vehicle behavior control apparatus capable of controlling a steering angle while smoothly changing the steering angle.

SUMMARY

In accordance with an exemplary embodiment of the present invention, there is provided a vehicle behavior control apparatus mounted in a vehicle. In the apparatus, boundary information acquisition means successively acquires detection results from a location sensor that successively detects a position of a boundary of a drivable road region situated in front of the vehicle. Current-position acquisition means successively acquires a current position of the vehicle. Virtual-road-outline determination means determines a virtual road outline that is an outline of a drivable road region where the vehicle will travel on the basis of the detection results from the location sensor acquired by the boundary information acquisition means. Reconstruction means reconstructs the virtual road outline determined by the virtual-road-outline determination means as a sequence of road segments, such as straight road segments, right-hand curved road segments, and left-hand road segments. First tentatively setting means, when a current road segment where the vehicle is currently present is a right- or left-hand curved road segment, tentatively sets a subsequent road segment where the vehicle will be present subsequently to the current road segment to a straight road segment until the vehicle reaches the subsequent road segment, even when the subsequent road segment is actually a left- or right-hand curved road segment. Virtual-road boundary distance calculation means, on the basis of the current position of the vehicle and a portion of the virtual road outline from the current road segment to the subsequent road segment, calculates a virtual-road boundary distance that is a distance from the vehicle to a boundary of the virtual road outline situated in front of the vehicle. Proper-distance calculation means, on the basis of the portion of the virtual road outline from the current road segment to the subsequent road segment, calculates a proper distance from the vehicle to the boundary of the virtual road outline situated in front of the vehicle. Steering means controls a steering angle so that the virtual-road boundary distance calculated by the virtual-road boundary distance calculation means is adapted to the proper distance calculated by the proper-distance calculation means.

In accordance with another exemplary embodiment of the present invention, there is provided a vehicle behavior control apparatus mounted in a vehicle and configured to acquire information via a communication device that transmits and receives information via inter-vehicle communications. In the apparatus, current-position acquisition means successively acquires a current position of the vehicle. Preceding-vehicle information acquisition means successively acquires preceding-vehicle information via the communication device, where the preceding-vehicle information is information successively transmitted from an inter-vehicle communication enabled preceding vehicle and is used to determine a virtual road outline that is an outline of a drivable road region where the vehicle will travel as a function of a travel path of the preceding vehicle. Virtual-road-outline determination means determines the virtual road outline on the basis of the preceding vehicle information acquired by the preceding-vehicle information acquisition means. Reconstruction means reconstructs the virtual road outline determined by the virtual-road-outline determination means as a sequence of road segments, such as straight road segments, right-hand curved road segments, and left-hand road segments. First tentatively setting means, when a current road segment where the vehicle is currently present is a right- or left-hand curved road segment, tentatively sets a subsequent road segment where the vehicle will be present subsequently to the current road segment to a straight road segment until the vehicle reaches the subsequent road segment, even when the subsequent road segment is actually a left- or right-hand curved road segment. Virtual-road boundary distance calculation means, on the basis of the current position of the vehicle and a portion of the virtual road outline from the current road segment to the subsequent road segment, calculates a virtual-road boundary distance that is a distance from the vehicle to a boundary of the virtual road outline situated in front of the vehicle. Proper-distance calculation means, on the basis of the portion of the virtual road outline from the current road segment to the subsequent road segment, calculates a proper distance from the vehicle to the boundary of the virtual road outline situated in front of the vehicle. Steering means controls a steering angle so that the virtual-road boundary distance calculated by the virtual-road boundary distance calculation means is adapted to the proper distance calculated by the proper-distance calculation means.

In accordance with still another exemplary embodiment of the present invention, there is provided a vehicle behavior control apparatus mounted in a vehicle and adapted to successively acquire, via a communication device, information transmitted from a roadside device via vehicle-roadside communications. In the apparatus, current-position acquisition means successively acquires a current position of the vehicle. Virtual-road-outline determination information acquisition means successively acquires virtual-road-outline determination information via the communication device, where the virtual-road-outline determination information is information transmitted from the roadside device and is used to determine a virtual road outline that is an outline of a drivable road region where the vehicle will travel. Virtual-road-outline determination means determines the virtual road outline on the basis of the virtual-road-outline determination information acquired by virtual-road-outline determination information acquisition means. Reconstruction means reconstructs the virtual road outline determined by the virtual-road-outline determination means as a sequence of road segments, such as straight road segments, right-hand curved road segments, and left-hand road segments. First tentatively setting means, when a current road segment where the vehicle is currently present is a right- or left-hand curved road segment, tentatively sets a subsequent road segment where the vehicle will be present subsequently to the current road segment to a straight road segment until the vehicle reaches the subsequent road segment, even when the subsequent road segment is actually a left- or right-hand curved road segment. Virtual-road boundary distance calculation means, on the basis of the current position of the vehicle and a portion of the virtual road outline from the current road segment to the subsequent road segment, calculates a virtual-road boundary distance that is a distance from the vehicle to a boundary of the virtual road outline situated in front of the vehicle. Proper-distance calculation means, on the basis of the portion of the virtual road outline from the current road segment to the subsequent road segment, calculates a proper distance from the vehicle to the boundary of the virtual road outline situated in front of the vehicle. Steering means controls a steering angle so that the virtual-road boundary distance calculated by the virtual-road boundary distance calculation means is adapted to the proper distance calculated by the proper-distance calculation means.

With these configurations, even when the own vehicle (referring to the vehicle mounting the apparatus therein) is traveling along an alternate sequence of right- and left-hand curved segments, a straight road segment is tentatively set by the first tentatively setting means subsequently to the first curved road segment. The virtual road boundary distance is calculated by the virtual road boundary distance calculation means from the current position of the own vehicle and the virtual road outline from the first curved road segment to the straight road segment.

This, even when the own vehicle is traveling along the sequence of curved segments, can prevent the virtual road boundary distance from increasing abruptly from the virtual road boundary distance from the own vehicle to the outer boundary of the first curved road segment to the virtual road boundary distance from the own vehicle to the outer boundary of the second curved road segment.

Therefore, when the own vehicle is traveling along the sequence of curved road segments, it becomes possible to prevent the virtual road boundary distance from changing abruptly when the steering angle of the own vehicle is controlled by the steering means so that the virtual road boundary distance is adapted to an optimal distance, which can prevent the steering angle from changing abruptly. When the own vehicle is traveling while automatically controlling the steering angle, this allows the own vehicle to travel along the travel path while changing the steering angle more smoothly.

DESCRIPTION OF SPECIFIC EMBODIMENTS

The present inventions will be described more fully hereinafter with reference to the accompanying drawings. Like numbers refer to like elements throughout. Embodiments which will be described below available in left hand drive countries may also be available in right hand drive countries by reversing left to right.

First Embodiment

Figure 1:
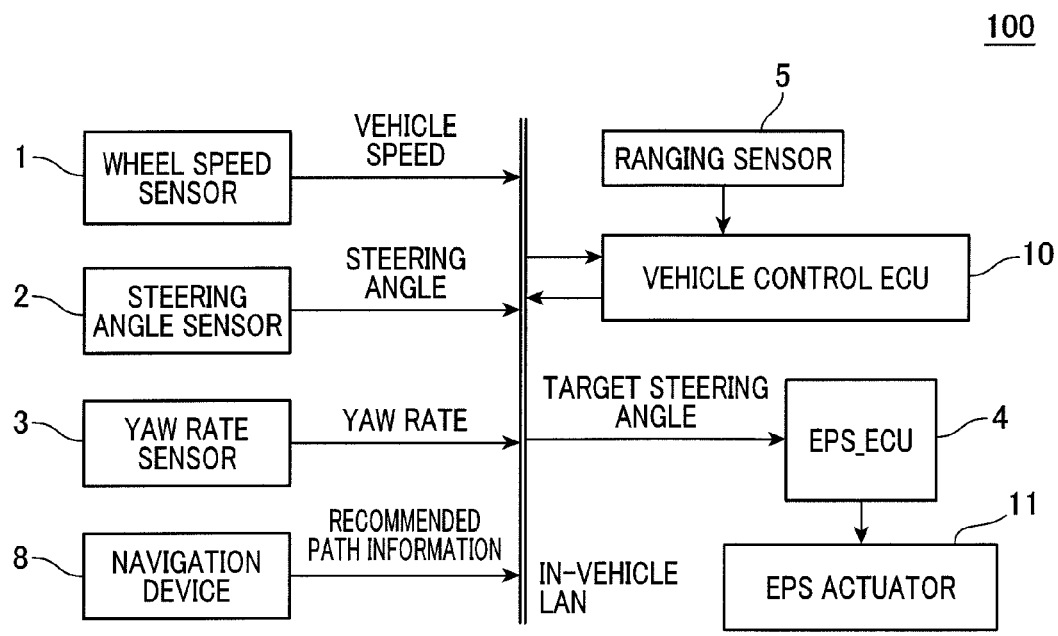
FIG. 1 shows a block diagram of a driving assistance system 100 in accordance with a first embodiment.

There will now be explained a driving assistance system 100 having the vehicle behavior control apparatus applied thereto in accordance with a first embodiment of the present invention. FIG. 1 shows the overall configuration of the driving assistance system 100. As shown in FIG. 1, the driving assistance system 100 includes a wheel speed sensor 1, a steering angle sensor 2, a yaw rate sensor 3, an electrical power steering electronic control unit (EPS_ECU) 4, a ranging sensor 5, and a vehicle control electronic control unit (ECU) 10.

The wheel speed sensor 1 detects a speed of the own vehicle from a revolution speed of each rolling wheel and transmits the detected own-vehicle speed to the in-vehicle LAN. The steering angle sensor 2 detects a steering angle Θ of the own vehicle and transmits the detected steering angle Θ to the in-vehicle LAN. The yaw rate sensor 3 detects an angular speed (yaw rate) around a vertical axis of the own vehicle and transmits the detected yaw rate to the in-vehicle LAN.

The EPS_ECU 4 operates an EPS actuator 11 to control the steering angle (i.e., steering angle) Θ. The EPS actuator 11, which includes a deceleration gear for rotation with an intermediate shaft coupled thereto and a motor to rotate the deceleration gear, is operable to change the steering angle Θ in response to an instruction signal from the EPS_ECU 4.

The ranging sensor 5 detects a position of a boundary of a drivable road region in front of the own vehicle. The ranging sensor 5, in the present embodiment, may include radar.

The radar is used to irradiate a predetermined detection area in front of the own vehicle with laser light or millimeter waves, receive reflected waves, and detect a distance from the own vehicle to a boundary of a road (road boundary), such as a guardrail or a curbstone or the like, in front of the own vehicle or an obstacle on the road, such as a preceding vehicle. The vehicle control ECU 10 detects the position of the road boundary or the obstacle relative to the own vehicle on the basis of distance data of the road boundary or the obstacle acquired by the radar.

The ranging sensor 5 and the vehicle control ECU 10 serve together as a location sensor. The vehicle control ECU 10 may be responsible for boundary information acquisition means. In some embodiments, the predetermined detection area in front of the own vehicle may extend to the left and/or right hand sides of the own vehicle. In addition, there may be provided a plurality of ranging sensors 5 responsible for different sensing directions. The ranging sensor 5 may further be configured to detect a position of the road boundary or the obstacle on the road relative to the own vehicle.

The ranging sensor 5 may include a camera in addition to or in place of the radar. The camera may also be used to detect a road boundary of a road, such as a guardrail or a curbstone or the like, in front of the own vehicle or an obstacle on the road, such as a preceding vehicle, by means of a well-known image-recognition technique. Given an installation position of the camera and a direction of a light axis, a distance from the own vehicle to the road boundary can be derived from positions of objects appearing in an image captured by the camera.

The vehicle control ECU 10, as a vehicle behavior control apparatus, primarily includes a well-known microcomputer having a central processing unit (CPU), a read-only memory (ROM), a random access memory (RAM), and input/output ports connected to each other via a bus. The vehicle control ECU 10 performs various processes on the basis of various kinds of information received from the wheel speed sensor 1, the steering angle sensor 2, the yaw rate sensor 3, the EPS_ECU 4, and the ranging sensor 5.

The vehicle control ECU 10 performs a current-position acquisition process, where the vehicle control ECU 10 acquires a sequence of positions of the own vehicle in a two-dimensional coordinate system with its origin at a position of the own vehicle at a time instant on the basis of speeds Vo of the own vehicle successively acquired from the wheel speed sensor 1 of the own vehicle and steering angles Θ successively acquired from the steering angle sensor 2 of the own vehicle. The vehicle control ECU 10 may be responsible for current-position acquisition means.

In some embodiments, the vehicle control ECU 10 may be configured to detect the sequence of positions of the own vehicle on the basis of information acquired from a terrestrial magnetism sensor sensitive to an earth's magnetic field or other sensors, such as a global positioning system (GPS) receiver that detects a current position of a vehicle on the basis of radio waves received from satellites.

The vehicle control ECU 10 determines an outline of a drivable road region (hereinafter referred to as a virtual road outline) and performs a reconstruction related process, where the virtual road outline is reconstructed as a sequence of variously-shaped road segments, such as straight road segments, right-hand curved road segments, and left-hand curved road segments.

Figure 2:
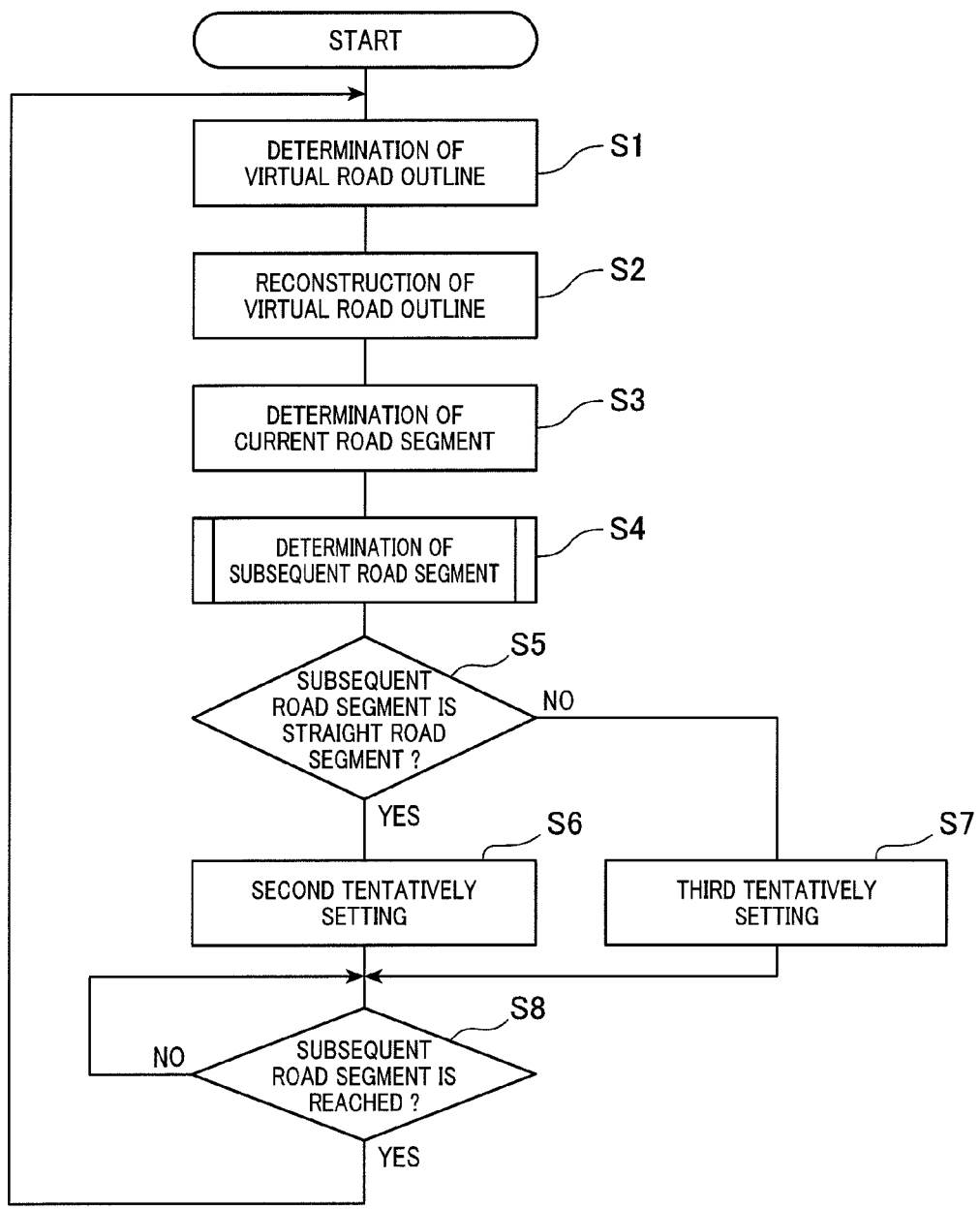
FIG. 2 shows a flowchart of a reconstruction related process.

There will now be explained a reconstruction related process with reference to a flowchart of FIG. 2. The process flow of FIG. 2 is initiated when the power supply of the vehicle control ECU 10 is turned on and terminated when the power supply is turned off. Alternatively, the process of FIG. 2 may be initiated when an operating switch of the vehicle control ECU 10 is turned on and terminated when the operating switch is turned off.

First, in step S1, a road outline determination process is performed. Thereafter, the flow proceeds to step S2. In the road outline determination process, a virtual road outline in front of the own vehicle with an origin at a current position of the own vehicle is determined on the basis of the positions of the road boundaries and the obstacles in front of the own vehicle detected by the ranging sensor 5. The vehicle control ECU 10 may be responsible for virtual-road-outline determination means for executing this step S1.

As an example, a travel path is created for driving around the road boundaries and the obstacles detected by using a well-known potential field method. The virtual road outline is defined having right and left predetermined half widths around the travel path as a centerline. The virtual road outline has boundaries on both sides of the travel path such that each of the right and left half widths corresponds to a distance of 1.75 m between a corresponding boundary and the travel path.

In the potential field method, it is assumed that the own vehicle experiences an attractive force toward a destination and a repulsive force from an obstacle. A composition of the attractive and repulsive forces leads to creation of a travel path that allows the own vehicle to travel around the obstacle toward its destination.

To determine the virtual road outline and boundaries thereof (hereinafter also referred to as the virtual-road boundaries) by using the potential field method, the vehicle control ECU 10 may be configured to acquire information about a recommended path to the destination of the own vehicle from a well-known navigation device 8 adapted to search for the recommended path. The vehicle control ECU 10 may be responsible for travel path information acquisition means. The recommended path is a travel path that allows the own vehicle to travel around the obstacles toward its destination.

Alternatively, the virtual road outline and its virtual-road boundaries may be acquired without using the potential field method in the following manner. The road boundaries and the boundaries of the obstacles are defined by connecting a sequence of points of position data of the road boundaries and the obstacles. Subsequently, the road boundaries and the boundaries of the obstacles detected on the left side of the lateral center of the own vehicle is defined as the left boundary of the virtual road outline. A boundary offset in the right widthwise direction from the left boundary by a predetermined distance (e.g., 3.5 m) is defined as a right boundary of the virtual road outline.

When road boundaries are detected not only on the left side, but also on the right side of the lateral center of the own vehicle, the boundaries on the left and right sides of the lateral center of the own vehicle may be defined as the left and right boundaries of the virtual road outline.

In any manners as described above, when the own vehicle is traveling on a two-lane road including a travel lane of the own vehicle and an oncoming lane, only a road region of the travel lane of the own vehicle may be defined as a virtual road outline. In addition, when parked vehicles and/or obstacles are present in front of the own vehicle, a road region for driving around the parked vehicles and/or the obstacles may be defined as a virtual road outline. Further, when overtaking a preceding vehicle, a road region for overtaking the preceding vehicle may be defined as a virtual road outline.

In step S2, a reconstruction process is performed. Thereafter, the flow proceeds to step S3. In the reconstruction process, the virtual road outline determined in the road outline determination process is reconstructed as a sequence of variously-shaped road segments, such as straight road segments and left-hand curved road segments and right-hand curved road segments. The vehicle control ECU 10 may be responsible for reconstruction means for executing this step S2.

In the reconstruction process of the present embodiment, the virtual road outline determined in the road outline determination process is decomposed into straight road segments, right-hand curved road segments, and left-hand curved road segments according to a signed curvature of the virtual road outline, and is thereby reconstructed as a sequence of such road segments.

More specifically, a straight road segment is a road segment for which an absolute value of its signed curvature is less than a predetermined value. A right-hand curved road segment is a road segment for which its signed curvature takes a negative value and its absolute value is equal to or greater than the predetermined value. A left-hand curved road segment is a road segment for which its signed curvature takes a positive value and its absolute value is equal to or greater than the predetermined value. The signed curvature of the virtual road outline is determined on the basis of a boundary (e.g., the left boundary) of the virtual road outline by using a well-known technique.

In step S3, a current-road-segment determination process is performed. Thereafter, the flow proceeds to step S4. In the current-road-segment determination process, a road segment where the own vehicle is currently present is determined as a current road segment. In exemplary embodiments, the current position of the own vehicle determined in the current-position acquisition process allows the road segment where the own vehicle is currently present to be determined.

Figure 3:
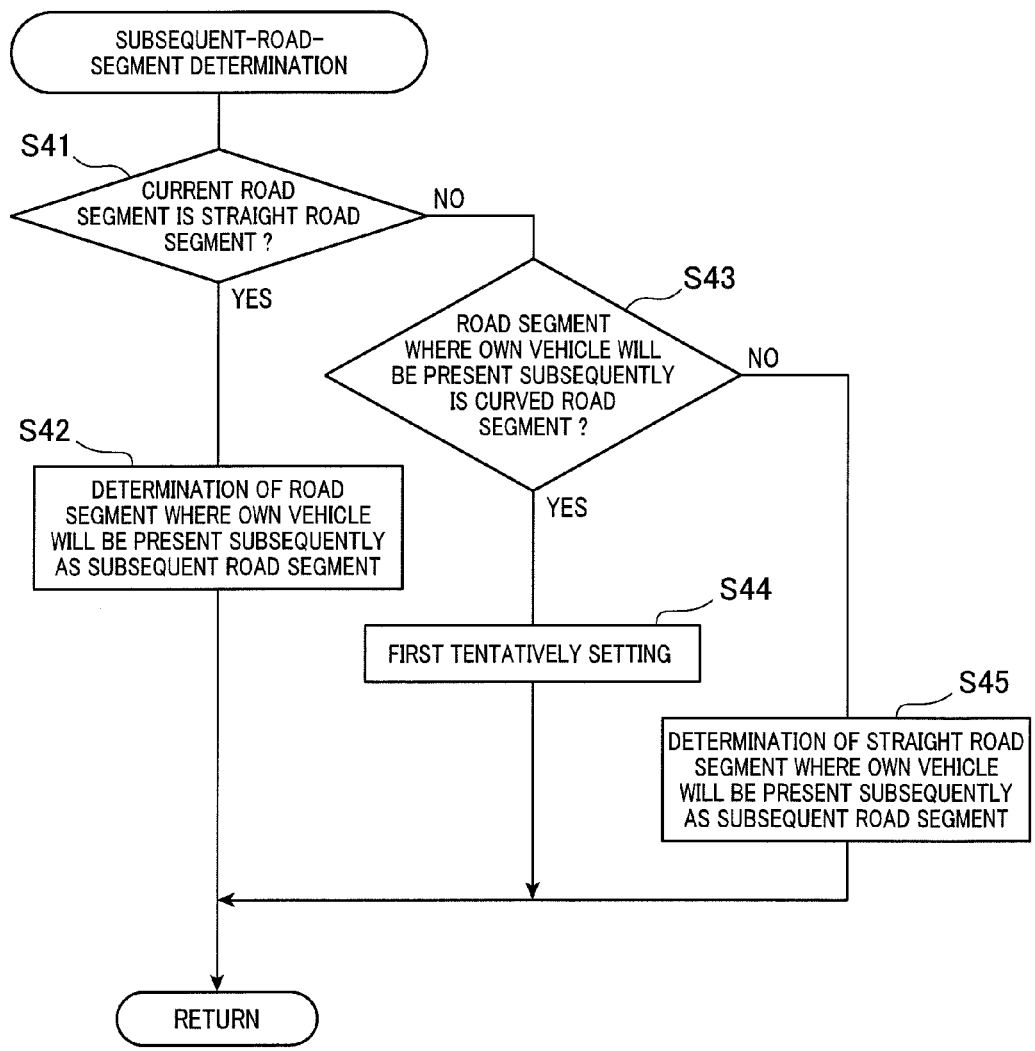
FIG. 3 shows a flowchart of a subsequent-road-segment determination process.

In step S4, a subsequent-road-segment determination process is performed. Thereafter, the flow proceeds to step S5. There will now be explained the subsequent-road-segment determination process with reference to a flowchart of FIG. 3.

In step S41, if it is determined that the current road segment determined in the current-road-segment determination process is a straight road segment, then the flow proceeds to step S42. If it is determined that the current road segment determined in the current-road-segment determination process is a curved road segment, then the flow proceeds to step S43.

In step S42, a road segment where the own vehicle will be present subsequently is determined as a subsequent road segment, the flow proceeds to step S5. More specifically, when the road segment where the own vehicle will be present subsequently is a right-hand curved road segment, the right-hand curved road segment is determined as the subsequent road segment. When the road segment where the own vehicle will be present subsequently is a left-hand curved road segment, the left-hand curved road segment is determined as the subsequent road segment.

The subsequent road segment may be estimated on the basis of a traveling direction of the own vehicle. The traveling direction may be estimated on the basis of a history of positions of the own vehicle acquired in the current-position acquisition process.

In step S43, if the road segment where the own vehicle will be present subsequently is a curved road segment, then the flow proceeds to step S44. If the road segment where the own vehicle will be present subsequently is a straight road segment, then the flow proceeds to step S45.

In step S44, a first tentatively setting process is performed. Thereafter, the flow proceeds to step S5 of FIG. 2. In the first tentatively setting process, the subsequent road segment is tentatively set to a straight road segment. In other words, when the current road segment is a right- or left-hand curved road segment, the subsequent road segment is tentatively set to a straight road segment even when the subsequent road segment is actually a left- or right-hand curved road segment. The vehicle control ECU 10 may be responsible for first tentatively setting means for executing this step S44.

The tentatively setting in the first tentatively setting process is kept until the own vehicle reaches the subsequent road segment. Step S44 corresponds to the first tentatively setting process.

The straight road segment tentatively set in the first tentatively setting process may be a road segment having left and right boundaries that are straight lines of a predetermined length tangential to the respective boundaries of the curved road segment at the ends of the respective boundaries of the curved road segment. The predetermined length may be an infinite length or a finite length of tens of meters or the like.

In step S45, the straight road segment where the own vehicle will be present subsequently is determined as the subsequent road segment. Thereafter, the flow proceeds to step S5.

Referring back to FIG. 2, in step S5, if it is determined that the subsequent road segment determined in the subsequent-road-segment determination process is a straight road segment, then the flow proceeds to step S6. If it is determined that the subsequent road segment determined in the subsequent-road-segment determination process is a curved road segment, then the flow proceeds to step S7.

In step S6, a second tentatively setting process is performed. Thereafter, the flow proceeds to step S8 of FIG. 2. In the second tentatively setting process, the subsequent road segment is tentatively set to an extended straight road segment that includes the straight road segment determined in the subsequent-road-segment determination process and its straight road extension. This setting is kept until the own vehicle reaches the subsequent road segment that is a straight road segment. The vehicle control ECU 10 may be responsible for second tentatively setting means for executing this step S6.

In the present embodiment, the straight road segment is extended only once by a predetermined (finite) length or an infinite length, thereby providing the extended straight road segment. Alternatively, the straight road segment may be extended by a predetermined length every predetermined time interval or every predetermined travel distance, thereby providing the extended straight road segment.

The second tentatively setting process may also be applied to the straight road segment tentatively set in the first tentatively setting process except where the straight road segment tentatively set in the first tentatively setting process has an infinite length or a finite length of hundreds of meters or the like.

The second tentatively setting process may be performed when the subsequent road segment is of less than a predetermined length. In other words, the second tentatively setting process doesn't have to be performed when the subsequent road segment is of a length equal to or greater than the predetermined length. In the present embodiment, as will be described below, the second tentatively setting process is performed only when the subsequent road segment is of less than the predetermined length.

In step S7, a third tentatively setting process is performed. Thereafter, the flow proceeds to step S8 of FIG. 2. In the third tentatively setting process, the subsequent road segment is tentatively set to an extended curved road segment that includes the curved road segment determined in the subsequent-road-segment determination process and its curved road extension. This setting is kept until the own vehicle reaches the subsequent road segment that is the curved road segment. The vehicle control ECU 10 may thus be responsible for the third tentatively setting means for executing this step S7.

More specifically, when the subsequent road segment determined in the subsequent-road-segment determination process is a right-hand curved road segment, the subsequent road segment is tentatively set to an extended right-hand curved road segment that includes the right-hand curved road segment and its right-hand curved road extension. When the subsequent road segment determined in the subsequent-road-segment determination process is a left-hand curved road segment, the subsequent road segment is tentatively set to an extended left-hand curved road segment that includes the left-hand curved road segment and its left-hand curved road extension.

In the present embodiment, the curved road segment is extended only once by a predetermined (finite) length or an infinite length, thereby providing the extended curved road segment. Alternatively, the curved road segment may be extended by a predetermined length every predetermined time interval or every predetermined travel distance, thereby providing an extended curved road segment.

The third tentatively setting process is performed when the subsequent road segment is of less than a predetermined length. In other words, the third tentatively setting process doesn't have to be performed when the subsequent road segment is of a length equal to or greater than the predetermined length. In the present embodiment, as will be described below, the third tentatively setting process is performed only when the subsequent road segment is of less than the predetermined length.

In step S8, it is determined whether or not the own vehicle has reached the subsequent road segment. Whether or not the own vehicle has reached the subsequent road segment may be determined on the basis of whether or not the current position of the own vehicle determined in the current-position acquisition process has reached the subsequent road segment. If it is determined in step S8 that the own vehicle has reached the subsequent road segment, then the flow returns to step S1. If it is determined in step S8 that the own vehicle has not reached the subsequent road segment yet, then the flow returns to step S8 again.

Referring back to FIG. 1, the vehicle control ECU 10 performs a curve determination process to determine whether or not a curve lies in front of the own vehicle, when the current-position road segment is a straight road segment and the subsequent-position road segment is a curved road segment.

In the present embodiment, the curve here refers not only to a real curve, but also to a curved road segment of a virtual road outline defined by the positions of the road boundaries and the obstacles situated in front of the own vehicle detected by using the ranging sensor 5. The curve may include, for example, a curved portion of an outline of a drivable road region for driving around parked vehicles or other obstacles on the road or for overtaking a preceding vehicle.

The vehicle control ECU 10 performs a steering angle control related process when it is determined in the curve determination process that a curve lies in front of the own vehicle. There will now be explained the steering angle control related process with reference to a flowchart of FIG. 4.

In step S101, a virtual-road boundary distance calculation process is performed. Thereafter, the flow proceeds to step S102 of FIG. 4. In the virtual-road boundary distance calculation process, a virtual-road boundary distance D_boun is calculated that is a distance from the own vehicle (more specifically, the front end of the own vehicle) to a boundary of a road segment of the virtual road outline (virtual-road boundary) situated in front of the own vehicle and along in the traveling direction of the own vehicle. The virtual-road boundary distance D_boun may be calculated by using the current position of the own vehicle in the 2D coordinate system and a portion of the virtual road outline between the current and subsequent road segments. The vehicle control ECU 10 may be responsible for virtual-road boundary distance calculation means for executing this step S101.

Figure 5:
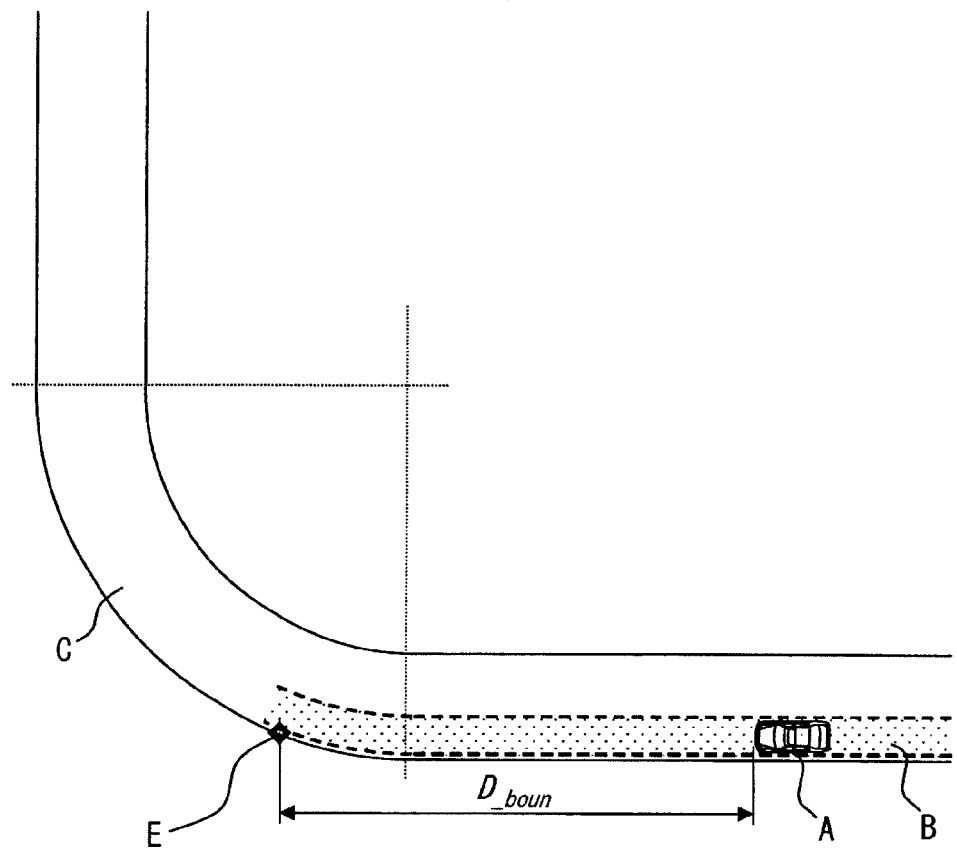
FIG. 5 shows an example of a virtual road boundary distance D_boun.

There will now be explained the virtual-road boundary distance D_boun with reference to FIG. 5. The virtual-road boundary distance D_boun is a distance from the own vehicle (more specifically, the front end of the own vehicle) to a virtual-road boundary situated in front of the own vehicle. The symbol "A" represents the own vehicle, the symbol "B" represents the virtual road outline, and the symbol "C" represents a real road outline. The symbol "E" represents the virtual-road boundary situated in front of the own vehicle. The dashed lines represent the virtual-road boundaries. Like elements from the previous drawings, embodiments, and description from above are labeled the same and will not be described again for brevity.

In step S102, a steering initiation determination process is performed. Thereafter, the flow proceeds to step S103 of FIG. 4. The vehicle control ECU 10 may be responsible for steering initiation determination means for executing this step S102. In the steering initiation determination process, a current value of a steering initiation indicator (KdB_e_p) is calculated, and it is determined whether or not the current value of the steering initiation indicator KdB_e_p is greater than a threshold for the steering initiation indicator (KdB_e_str) defined as a function of the virtual-road boundary distance D_boun. The vehicle control ECU 10 may further be responsible for steering initiation indicator calculation means and steering initiation determination means for executing this step S102.

A steering initiation indicator KdB_e will now be explained. KdB_e is indicative of a rate of change per unit time of visually perceived dimensions of an object appearing in the driver's eyes, such as a curbstone or a white marking or the like of the curve situated in front of the own vehicle (hereinafter referred to as a curve boundary object). KdB_e is an indicator that is indicative of a status of the own vehicle approaching the virtual-road boundary situated in front of the own vehicle (or indicative of how rapidly the own vehicle is approaching the virtual-road boundary situated in front of the own vehicle), which indicator is expressed as a function of a speed of the own vehicle approaching the virtual-road boundary situated in front of the own vehicle. KdB_e increases with an increasing approaching speed of the own vehicle approaching the virtual-road boundary situated in front of the own vehicle and the rate of increase in steering initiation indicator KdB_e with decreasing virtual-road boundary distance D_boun increases more rapidly with decreasing virtual-road boundary distance D_boun. The steering initiation indicator KdB_e is given by the following Equation 1, where Vo is a speed of the own-vehicle.

$$\text{KdB\_e} = 10 \times \log_{10}\left(\left|4 \times 10^7 \times \frac{Vo}{(D\_boun)^3}\right|\right) \qquad (1)$$

Eq. 1 shows that the steering initiation indicator KdB_e increases with increasing speed Vo of the own vehicle and increases with decreasing virtual-road boundary distance D_boun. Since the steering initiation indicator KdB_e includes an inverse of the cubic of virtual-road boundary distance D_boun, the rate of increase in steering initiation indicator KdB_e with decreasing virtual-road boundary distance D_boun increases more rapidly with decreasing virtual-road boundary distance D_boun.

Typically, a driver determines, from a rate of change per unit time of visually perceived dimensions of a curve boundary object, a rough approaching speed at which the own vehicle approaches the curve and a distance from the own vehicle to the curve, thereby determining a timing at which steering of the own vehicle for turning along the curve is initiated. Accordingly, use of the steering initiation indicator KdB_e allows the steering of the own vehicle to be initiated at an actual timing at which the driver actually initiates the steering of the own vehicle right before the own vehicle enters the curve.

Some experiments were conducted by the inventors of the present application under a situation that a professional driver is instructed to initiate the steering of the own vehicle at a timing such that the vehicle can follow a curve situated in front of the own vehicle. Consequently, it has been found that steering initiation points at which the driver initiated the steering are distributed along a curve shown in FIG. 6.

Figure 6:
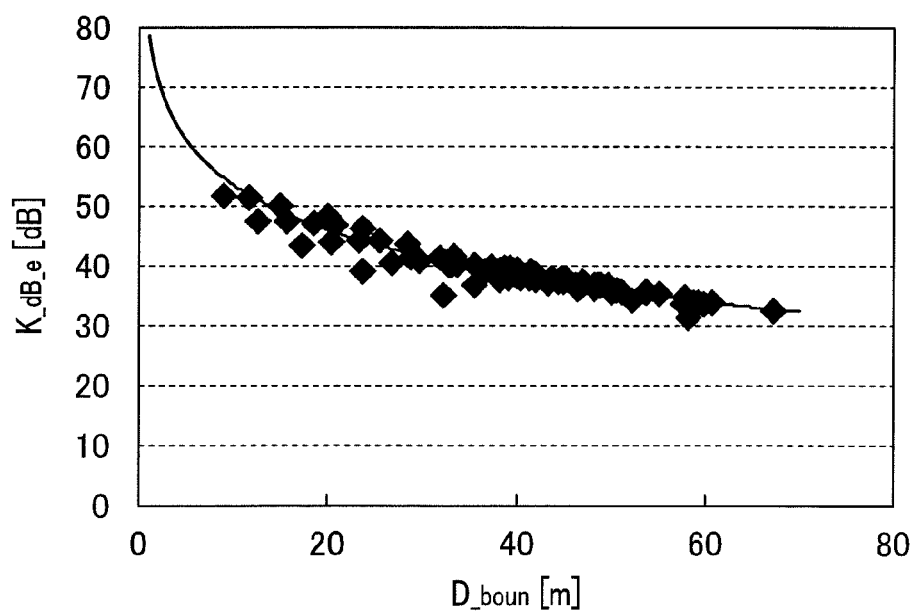
FIG. 6 shows an example of a winding road driving assessment for a professional driver.
Figure 7:
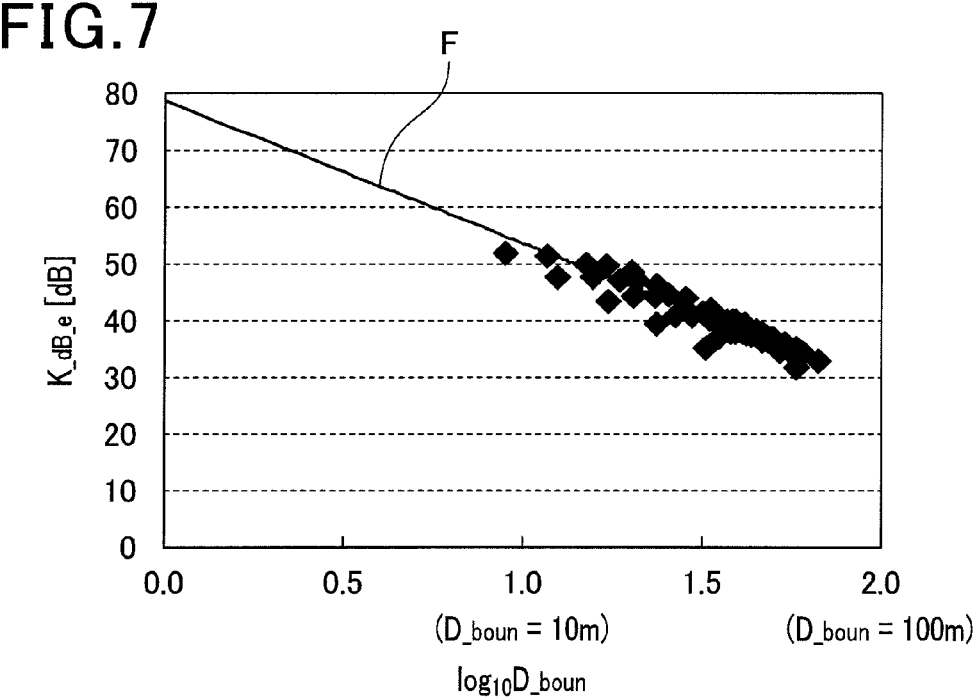
FIG. 7 shows an example of a threshold KdB-e_str of steering initiation indicator.

FIG. 7 shows an exemplary plot of KdB_e over $\log_{10}$ D_boun, where KdB_e and D_boun come from the plot shown in FIG. 6. The line F in FIG. 7 provides an approximation to the curve of FIG. 6. Eq. 2 is a steering initiation discriminant, which defines a threshold KdB_e_str for the steering initiation indicator KdB_e.

$$KdB\_e\_str = b \log_{10}(D\_boun) + c + \Delta c \quad (2)$$

In Eq. 2, the parameters b, c are constants, for example, such that b=−25.00 and c=78.58. Δc is a correction term. A threshold KdB_e_str determined by Eq. 2 without the correction term Δc is just a steering initiation indicator KdB_e at which the driver initiates the steering of the own vehicle right before the own vehicle enters the curve. Therefore, without the correction term Δc, the driver will feel uncomfortable due to premature control.

Figure 8:
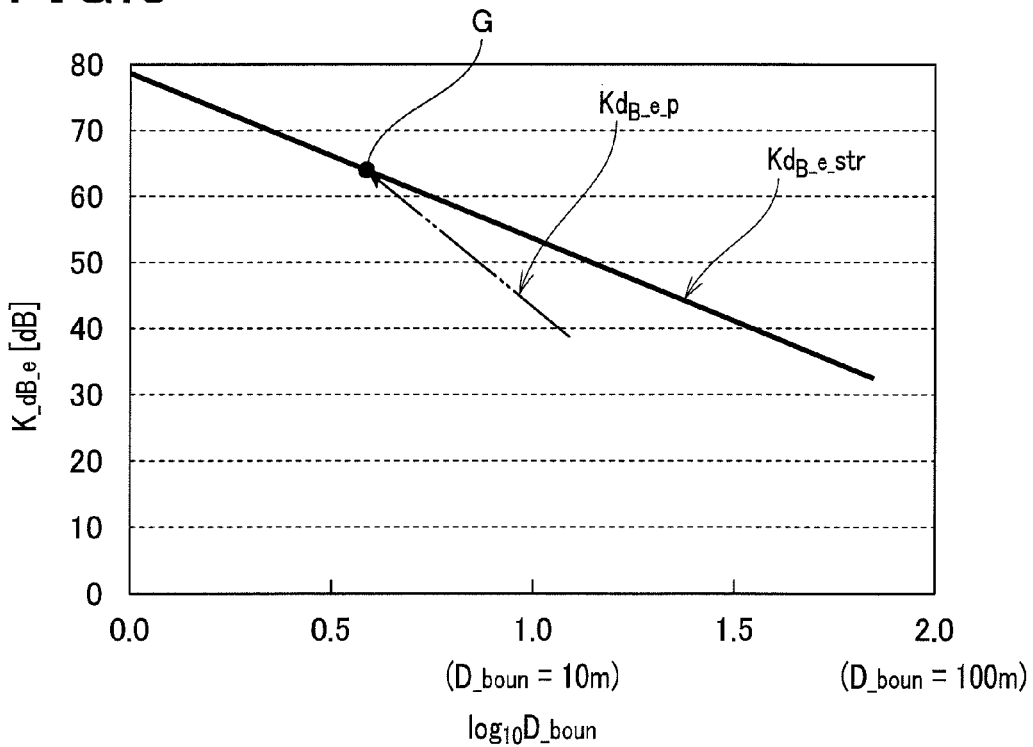
FIG. 8 shows a relation between a current value KdB_e_p and a threshold KdB_e_str of the steering initiation indicator.
Figure 9:
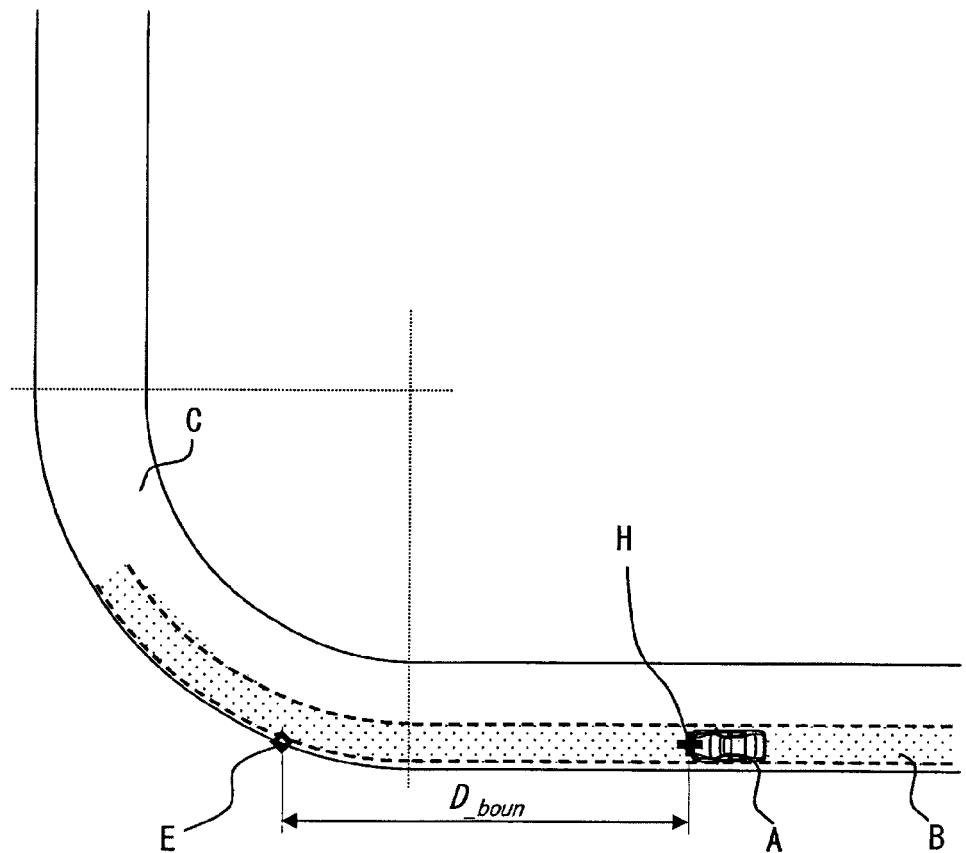
FIG. 9 shows an example of a steering initiation point determination process.

Referring back to FIG. 4, in step S103, a steering initiation point determination process is performed. Thereafter, the flow proceeds to step S104. In the steering initiation point determination process, if a current value of the steering initiation indicator KdB_e_p is greater than the threshold KdB_e_str (at the point "G" in FIG. 8), then the current position of the own vehicle is determined as a steering initiation point. The vehicle control ECU 10 may thus be responsible for steering initiation point determination means for executing this step S103. The vehicle control ECU 10 initiates steering of the own vehicle at the steering initiation point (at the point "H" in FIG. 9). The vehicle control ECU 10 may further be responsible for steering initiation means for executing this step S103.

Figure 10:
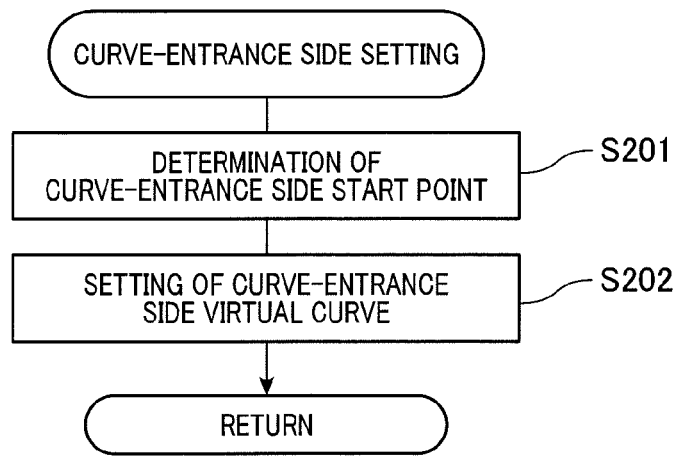
FIG. 10 shows a flowchart of a curve-entrance side setting process.

In step S104, a curve-entrance side setting process is performed in the vehicle control ECU 10. Thereafter, the flow proceeds to step S105. There will now be explained the curve-entrance side setting process with reference to a flowchart of FIG. 10.

In step S201, a curve-entrance side start point determination process is performed. Thereafter, the flow proceeds to step S202. In the curve-entrance side start point determination process, a position situated a predetermined distance or more away from the steering initiation point as described above in the forward direction of the own vehicle is determined as a start point of a virtual curve for a curve-entrance transition area (hereinafter referred to as a curve-entrance side start point). The vehicle control ECU 10 may thus be responsible for curve-entrance side start point determination means for executing this step S201. The predetermined distance may be a finite distance of hundreds of meters or an infinite distance.

The curve-entrance transition area is an area within the virtual road outline extending from the steering initiation point in a straight road segment as the current road segment to a predetermined point within a curved road segment or an extended curved road segment as the subsequent road segment. The predetermined point within the curved road segment or the extended curved road segment (hereinafter referred to as an end point of the curve-entrance transition area) is such that a curve-entrance side end point that will be described later is situated in front of the own vehicle at the predetermined point.

In step S202, a curve-entrance side virtual curve setting process is performed. Thereafter, the flow proceeds to step S105. The vehicle control ECU 10 may thus be responsible for curve-entrance side virtual curve setting means for executing this step S202. In the curve-entrance side virtual curve setting process, a curve expressed by a set of x-coordinate X_in given by Eq. 10 and y-coordinate Y_in given by Eq. 11 with an origin that is set at the steering initiation point is defined as a curve-entrance side virtual curve.

$$X\_in = \underbrace{A \times \sqrt{2 \times \tau} \times \left(1 - \frac{1}{2! \times 5} \times \tau^2 + \frac{1}{4! \times 9} \times \tau^4 - \frac{1}{6! \times 13} \times \tau^6 + \ldots \right)}_{\text{first term}} \\ + \underbrace{\sqrt{\frac{D^2 + L^2}{2 \times L} \times 2 \times L - L^2} \times \cos\tau}_{\text{second term}} - \underbrace{D\_in}_{\text{third term}} \quad (10)$$

The first term in Eq. 10 is an X-direction component of a defining equation of a clothoid curve. The second term in Eq. 10 is a correction term for an X-direction distance calculated from a tire turning angle when traveling along the clothoid curve. The third term in Eq. 10 is a correction term for setting a start point of a second region to the origin of the coordinate system.

$$Y\_in = \underbrace{A \times \tau \times \sqrt{2 \times \tau} \times \left(\frac{1}{3} - \frac{1}{3! \times 7} \times \tau^2 + \frac{1}{5! \times 11} \times \tau^4 - \frac{1}{7! \times 15} \times \tau^6 + \ldots \right)}_{\text{first term}} + \underbrace{\sqrt{\frac{D^2 + L^2}{2 \times L} \times 2 \times L - L^2} \times \sin\tau}_{\text{second term}} \quad (11)$$

The first term in Eq. 11 is a Y-direction component of the defining equation of the clothoid curve. The second term in Eq. 11 is a correction term for a Y-direction distance calculated from the tire turning angle when traveling along the clothoid curve.

The parameter "A" in Eq. 10 and Eq. 11 is a constant given by Eq. 12. The parameter "R" in Eq. 12 may be an outer curvature radius of a curved road segment (or an extended curved road segment) as the subsequent road segment. The curvature radius may be derived from a curvature of the curved road segment. The parameter "l" in Eq. 12 represents a curve length.

$$A = \sqrt{R \times l} \quad (12)$$

The parameter "τ" in Eq. 10 and Eq. 11 is a helix angle given by Eq. 13. The parameter "R" in Eq. 13 may be similar to the parameter "R" in Eq. 12. The parameter "D" in Eq. 10 and Eq. 11 is a distance from the own vehicle to a curve-entrance side virtual curve situated in front of the own vehicle (hereinafter referred to as a curve-entrance side virtual curve distance D_trans_in). That is, D=D_trans_in. In addition, D_in is a distance from the steering initiation point to the entrance point of the curve.

$$\tau = \frac{l}{2 \times R} \qquad (13)$$

The curve-entrance point may be determined in a curve-entrance determination process performed in the vehicle control ECU 10. In the curve-entrance determination process, the curve-entrance point is determined on the basis of the curvature radius of the curved road segment as the subsequent road segment. More specifically, the first point at which the curvature radius reaches a curve-entrance determination threshold is determined as the curve-entrance point. Alternatively, a curvature may be used instead of the curvature radius. The curve-entrance determination threshold is a curvature radius taking such a value that a road segment having the curvature radius cannot be regarded as straight.

An intersection point of a curve-entrance side virtual curve that is set in the curve-entrance side virtual curve setting process and an outer boundary of a curved road segment as the subsequent road segment is determined as the end point of a virtual-road boundary of the curve-entrance transition area (hereinafter referred to as a curve-entrance side end point) is determined in the vehicle control ECU 10.

Figure 11:
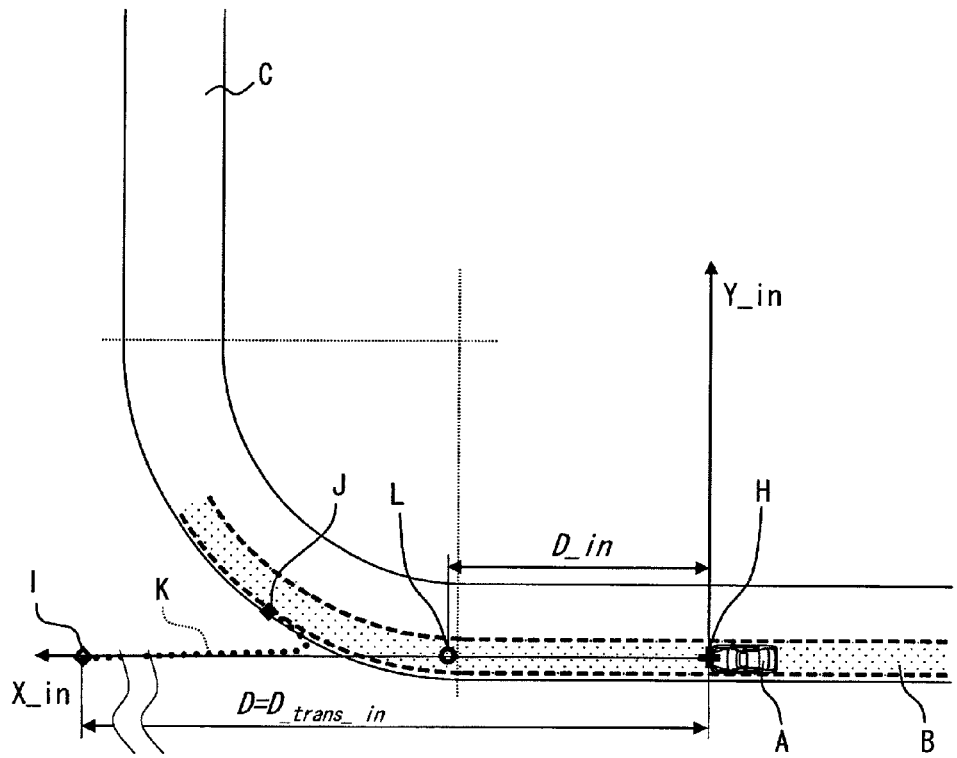
FIG. 11 shows an example of a curve-entrance side start point, a curve-entrance side end point, and a curve-entrance side virtual curve.

FIG. 11 exemplary shows a curve-entrance side start point I, a curve-entrance side end point J, and a curve-entrance side virtual curve K, and an entrance point L.

Figure 12:
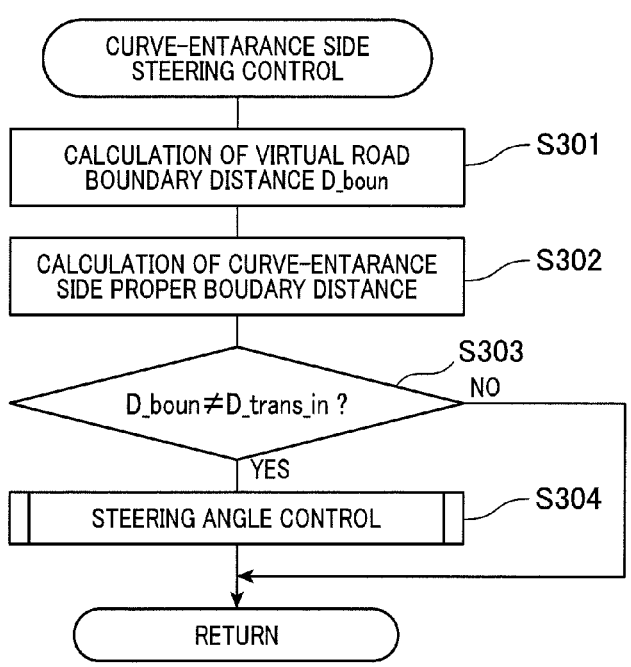
FIG. 12 shows a flowchart of a curve-entrance side steering control process.

Referring back to FIG. 4, in step S105, a curve-entrance side steering control process is performed in the vehicle control ECU 10. Thereafter, the flow proceeds to step S106. The curve-entrance side steering control process will now be explained with reference to a flowchart of FIG. 12.

In step S301, as in step S101, the virtual-road boundary distance D_boun is calculated. Thereafter, the flow proceeds to step S302. In step S302, a curve-entrance side proper boundary distance calculation process is performed. Thereafter, the flow proceeds to step S303. In the curve-entrance side proper boundary distance calculation process, the curve-entrance side virtual curve distance D_trans_in is calculated. The calculated curve-entrance side virtual-road boundary distance D_trans_in is set as a proper boundary distance Dc.

The vehicle control ECU 10 may thus be responsible for proper-distance calculation means for executing this step S302. The curve-entrance side virtual curve distance D_trans_in is a distance from the own vehicle to the curve-entrance side virtual curve situated along a virtual extension in the travel direction of the own vehicle (i.e., in front of the own vehicle) (see FIG. 11).

The curve-entrance side virtual curve distance D_trans_in may be calculated, for example, by replacing the x- and y-coordinates (X_in, Y_in) of the curve-entrance side virtual curve with the corresponding x- and y-coordinates in the above described two-dimensional coordinate system. Alternatively, the curve-entrance side virtual curve distance D_trans_in may be calculated by replacing the current position of the own vehicle in the above described two-dimensional coordinate system with the corresponding coordinates in the (X_in, Y_in) coordinate system.

In step S303, a steering angle suitability determination process is performed. In the steering angle suitability determination process, the virtual-road boundary distance D_boun calculated in step S301 is compared with the curve-entrance side virtual curve distance D_trans_in set in step S302 as the proper boundary distance Dc.

If the virtual-road boundary distance D_boun is not equal to the proper boundary distance Dc (here, the curve-entrance side virtual curve distance D_trans_in) (i.e., D_boun≠D_trans_in), then it is determined that the steering angle Θ is improper. Thereafter, the flow proceeds to step S304. If the virtual-road boundary distance D_boun is equal to the proper boundary distance Dc (i.e., D_boun=D_trans_in), then it is determined that the steering angle Θ is proper. Thereafter, the flow proceeds to step S106.

Figure 13:
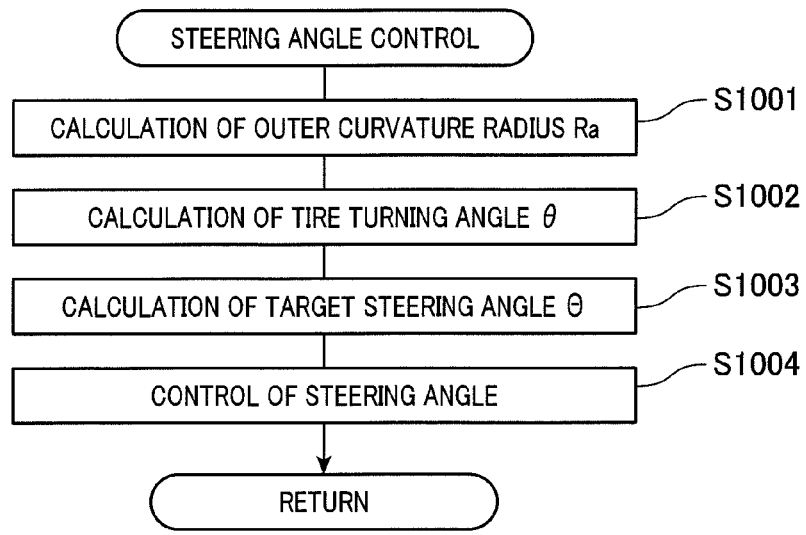
FIG. 13 shows a flowchart of a steering angle control.

In step S304, a steering angle control process is performed in the vehicle control ECU 10. Thereafter, the flow proceeds to step S106. There will now be explained the steering angle control process with reference to a flowchart of FIG. 13.

In step S1001, an estimated outer curvature radius Ra is calculated by using the following Eq. 3. Thereafter, the flow proceeds to step S1002. In Eq. 3, Dc is a proper boundary distance, L is a lateral distance from the widthwise centerline of the own vehicle (extending in the vehicle longitudinal direction) to a virtual-road boundary. The estimated outer curvature radius Ra is an outer curvature radius for steering angle control. Eq. 3 can be derived from the Pythagorean Theorem for the rectangular triangles.

$$Ra = \frac{Dc^2 + L^2}{2 \times L} \qquad (3)$$

In step S1002, a tire turning angle θ is calculated by substituting the estimated outer curvature radius Ra or the like derived in step S1001 into Eq. 4. Thereafter, the flow proceeds to step S1003. The vehicle control ECU 10 may thus be responsible for tire turning angle calculation means for executing this step S1002. In Eq. 4, the parameter "WB" is a vehicle wheelbase [m].

$$\theta = \frac{180 \times WB}{\pi \times (Ra - L)}[deg] \qquad (4)$$

In step S1003, a target steering angle Θ is calculated as a function of the tire turning angle θ by substituting the tire turning angle θ derived in step S1002 into Eq. 5. Thereafter, the flow proceeds to step S1004. The vehicle control ECU 10 may thus be responsible for steering angle calculation means for executing this step S1003. In Eq. 5, the parameter "N" is a ratio of the target steering angle Θ to the tire turning angle θ.

$$\Theta = N \times \theta \qquad (5)$$

In step S1004, the steering angle is actually changed. More specifically, the target steering angle Θ calculated in step S1003 is fed to the EPS_ECU 4. The EPS_ECU 4 detects a steering angle via the steering angle sensor 2 to control the EPS actuator 11, thereby changing the steering angle at a predetermined rate of change so as to approach the target steering angle Θ. The EPS_ECU 4 may thus be responsible for steering means.

In step S106, it is determined whether or not the end point of the curve-entrance transition area is reached. As an example, if a distance between the current position of the own vehicle and the end point of the curve-entrance transition area is larger than zero, then it is determined that the end point of the curve-entrance transition area has not be reached yet. If the distance between the current position of the own vehicle and the end point of the curve-entrance transition area is equal to or less than zero, then it is determined that the end point of the curve-entrance transition area has been reached.

Since, when the own vehicle has reached the end point of the curve-entrance transition area, the own vehicle has reached a curved road segment as the subsequent road segment, the current road segment is the curved road segment. A road segment subsequent to the curved road segment is therefore a straight road segment.

If it is determined in step S106 that the end point of the curve-entrance transition area is reached, then the flow proceeds to step S107. If the end point of the curve-entrance transition area has not been reached yet, then the flow returns to step S105 and will be repeated therefrom.

Figure 14:
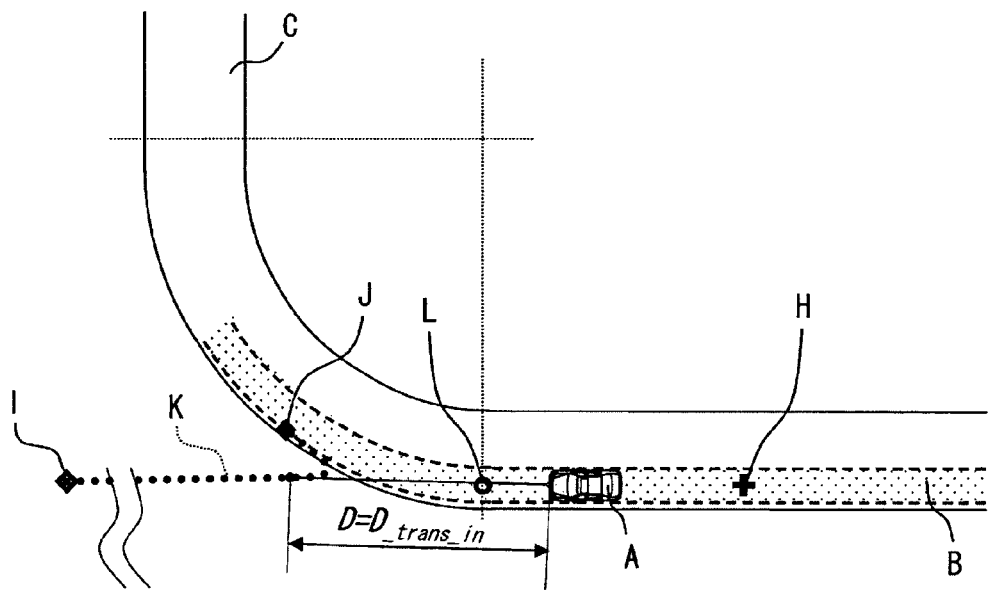
FIG. 14 shows an example of steering control on the basis of a curve-entrance side virtual curve distance D_trans_in.
Figure 15:
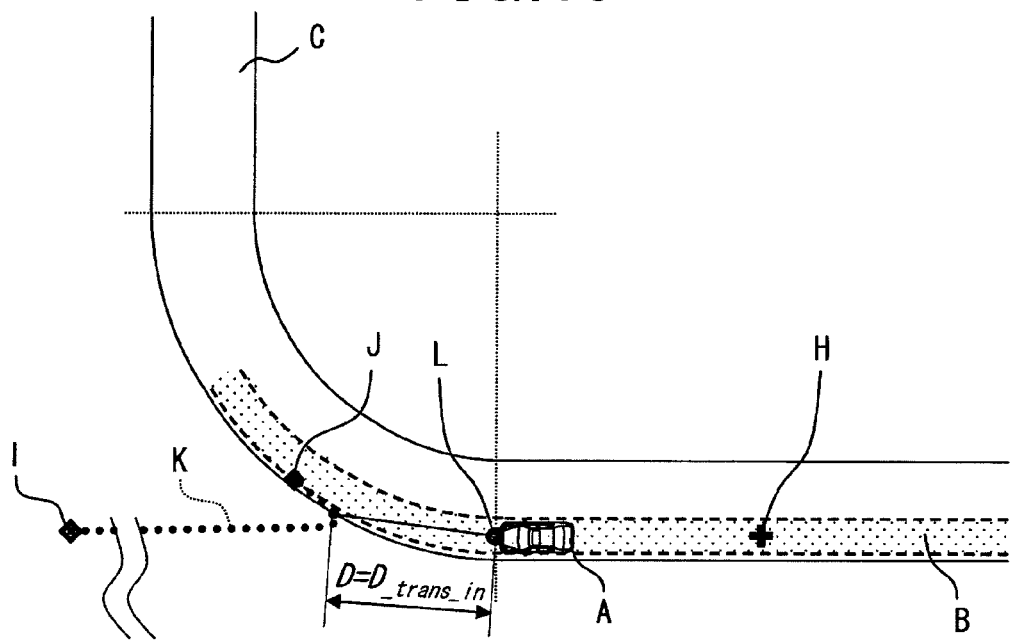
FIG. 15 shows an example of steering control on the basis of a curve-entrance side virtual curve distance D_trans_in.
Figure 16:
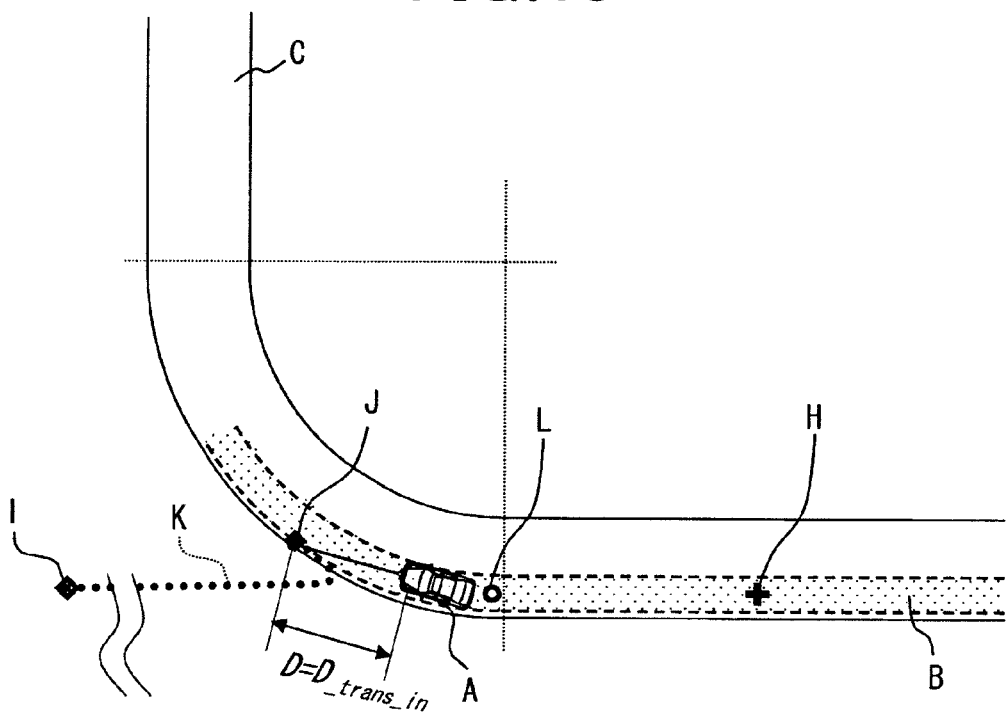
FIG. 16 shows an example of steering control on the basis of a curve-entrance side virtual curve distance D_trans_in.

In the curve-entrance transition area, as shown in FIG. 14, FIG. 15, FIG. 16, the steering angle is automatically changed so that the virtual-road boundary distance D_boun becomes equal to the curve-entrance side virtual curve distance D_trans_in (i.e., D_boun=D_trans_in). This allows the own vehicle to travel while automatically changing the steering angle smoothly during traveling in the curve-entrance transition area.

Figure 17:
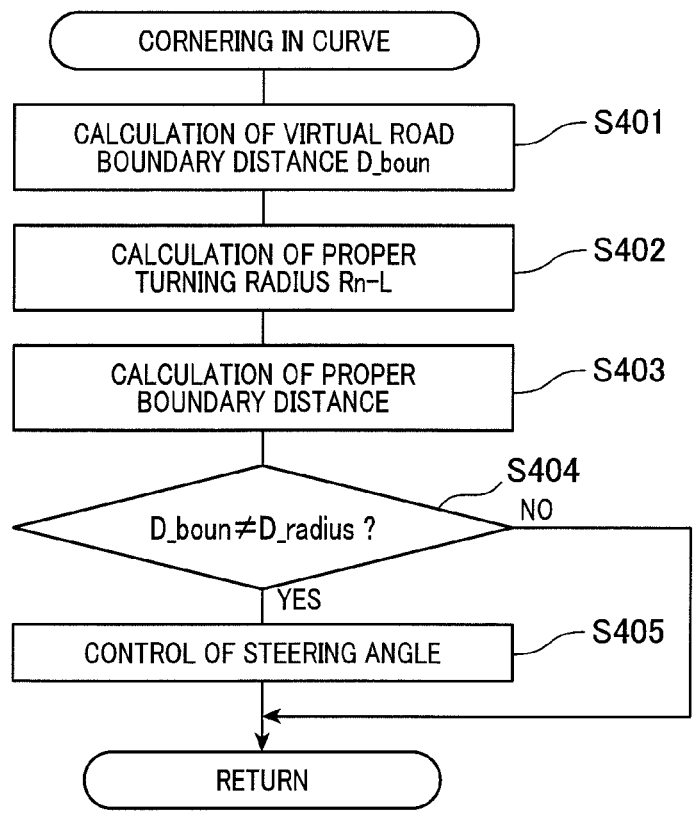
FIG. 17 shows a flowchart of a cornering process.

In step S107, a cornering process is performed. Thereafter, the flow proceeds to step S108. The cornering process will now be explained with reference to a flowchart of FIG. 17.

First, in step S401, a virtual-road boundary distance D_boun is calculated in a similar manner as in step S301. Thereafter, the flow proceeds to step S402.

In step S402, a proper turning radius Rn−L is calculated. Thereafter, the flow proceeds to step S403. The proper turning radius Rn−L may be calculated by subtracting a lateral distance L from the widthwise centerline of the own vehicle (extending in the vehicle longitudinal direction) to an outer virtual-road boundary from an outer curvature radius Rn, at the current position of the own vehicle, of the curved road segment as the current road segment in which the own vehicle is traveling.

The outer curvature radius Rn is successively calculated from the virtual road outline. The parameter L represents a lateral position of the own vehicle relative to the outer virtual-road boundary, which is determined from a lateral distance between the current position of the own vehicle acquired in the current-position acquisition process and the outer virtual-road boundary of the curved road segment.

In the present embodiment, the proper turning radius is calculated by subtracting the distance L from the outer curvature radius Rn. Alternatively, the proper turning radius may be calculated by adding a distance L' to an inner curvature radius. The distance L' is determined from a lateral distance between the current position of the own vehicle acquired in the current-position acquisition process and an inner virtual-road boundary of the curved road segment.

In step S403, D_radius is calculated as a proper boundary distance Dc that is a proper distance to the virtual-road boundary. Thereafter, the flow proceeds to step S404. The vehicle control ECU 10 may thus be responsible for proper-distance calculation means for executing this step S403.

The proper boundary distance Dc is calculated by using Eq. 14. The proper boundary distance Dc (as a proper distance) means a distance from the front end of the own vehicle to the virtual-road boundary situated in front of the own vehicle while the own vehicle is traveling along a circular path having the proper turning radius Rn−L.

$$D\_radius = \sqrt{Rn^2 - (Rn-L)^2} \quad (14)$$

In step S404, a steering angle suitability determination process is performed. In the steering angle suitability determination process, the virtual-road boundary distance D_boun calculated in step S401 is compared with the proper boundary distance D_radius calculated in step S403. If the virtual-road boundary distance D_boun is not equal to the proper boundary distance D_radius (i.e., D_boun≠D_radius), then it is determined that the steering angle is improper or unsuitable. Thereafter, the flow returns to step S405. If the virtual-road boundary distance D_boun is equal to the proper boundary distance D_radius (i.e., D_boun=D_radius), then it is determined that the steering angle is proper or suitable. Thereafter, the flow proceeds to step S108.

In step S405, as in above step S304, steering angle control is conducted. Thereafter, the flow proceeds to step S108.

When the virtual-road boundary distance D_boun is equal to the proper boundary distance Dc (D_boun=D_radius), the estimated outer curvature radius Ra becomes equal to the outer curvature radius Rn (Rn=Ra). In such a case, the travel path of the own vehicle will have a proper turning radius of the curved road segment as the current road segment without changing the steering angle.

On the other hand, for example, a steering delay may lead to a virtual-road boundary distance D_boun less than the proper boundary distance Dc (D_boun<D_radius). In such a case, the estimated outer curvature radius Ra becomes less than the outer curvature radius Rn (Rn>Ra), and a turning radius of a travel path of the own vehicle may deviate from the proper turning radius of the curved road segment as the current road segment.

If the virtual-road boundary distance D_boun is not equal to the proper boundary distance Dc, then the steering angle is automatically controlled so as to be adapted to a target steering angle Θ, so that the virtual-road boundary distance D_boun becomes equal to the proper boundary distance Dc (D_radius). This allows a turning radius of the travel path of the own vehicle to be automatically adapted to the proper turning radius and the own vehicle to keep the proper turning radius during turning along the virtual curve.

In step S108, a reverse steering initiation point determination process is performed, where it is determined whether or not a reverse steering initiation point is reached. The reverse steering initiation point may be acquired by the vehicle control ECU 10 in the following manner.

First, an intersection point (hereinafter referred to as an exit side intersection point) of a virtual-road boundary of a virtual curve (more specifically, a curved road segment as the current road segment) and a virtual-road boundary of a straight road segment (more specifically, an extended straight road segment) as the subsequent road segment is determined. In addition, when an extended curved road segment has been set tentatively until the curved road segment as the current road segment is reached, an intersection point of a virtual-road boundary of the extended curved road segment and a virtual-road boundary of an extended straight road segment as the subsequent road segment is determined as an exit side intersection point. A position of the own vehicle such that the exit side intersection point is situated in front of the own vehicle at the position is defined as a reverse steering initiation point. Further, the exit point of the virtual curve is defined as a steering termination point.

An exit point of the virtual curve may be determined in a curve-exit determination process performed in the vehicle control ECU 10. In the curve-exit determination process, the exit point of the curve is determined on the basis of a curvature radius of the curved road segment as the current road segment. In addition, when an extended curved road segment has been set tentatively until the curved road segment as the current road segment is reached, the curve-exit point is determined on the basis of a curvature radius of the extended curved road segment.

More specifically, the first point at which the curvature radius reaches a curve-exit determination threshold is determined as the curve-exit point. Alternatively, a curvature may be used instead of the curvature radius. The curve-exit determination threshold is a curvature radius taking such a value that a road segment having the curvature radius cannot be regarded as straight, and may be set to a value less than the curve-entrance determination threshold taking into account hysteresis. The vehicle control ECU 10 may thus be responsible for curve-exit determination means, reverse steering initiation point determination means, and steering termination point determination means.

As an example, in the reverse steering initiation point determination process, if a distance between the current position of the own vehicle and the reverse steering initiation point is larger than zero, then it is determined that the reverse steering initiation point has not be reached yet. If the distance between the current position of the own vehicle and the reverse steering initiation point is equal to or less than zero, then it is determined that the reverse steering initiation point has been reached.

If it is determined in step S108 that the reverse steering initiation point is reached, then the flow proceeds to step S109. If the reverse steering initiation point has not been reached yet, the flow returns to step S107 and is repeated therefrom.

Figure 18:
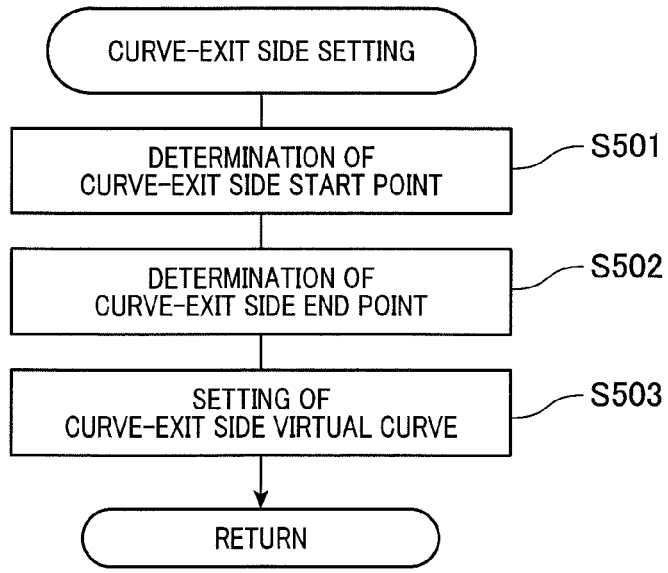
FIG. 18 shows a flowchart of a curve-exit side setting process.

In step S109, a curve-exit side setting process is performed. Thereafter, the flow proceeds to step S110. The curve-exit side setting process will now be explained with reference to a flowchart of FIG. 18.

In step S501, a curve-exit side start point determination process is performed. Thereafter, the flow proceeds to step S502. In the curve-exit side start point determination process, the exit side intersection as described above is determined as a start point of a virtual curve for a curve-exit transition area (hereinafter referred to as a curve-exit side start point). The vehicle control ECU 10 may thus be responsible for curve-exit side start point determination means for executing this step S501. The curve-exit transition area is an area within the virtual road outline extending from the reverse steering initiation point to steering termination point.

In step S502, a curve-exit side end point determination process is performed. Thereafter, the flow proceeds to step S503. In the curve-exit side end point determination process, a point that is away from the exit point determined in the curve-exit determination process by a distance as a function of the own-vehicle speed Vo and is situated along (or on) the centerline of a straight road segment (more specifically, a straight road segment as the subsequent road segment) forward of the exit point is determined as a curve-exit side end point for the curve-exit transition area. The vehicle control ECU 10 may thus be responsible for curve-exit side end point determination means for executing this step S502.

The curve-exit transition area extends from the reverse steering initiation point to the steering termination point (i.e., the end point of the curve-exit transition area). In addition, the point that is away from the exit point by a distance as a function of the own-vehicle speed Vo may be a point away from the exit point by a distance given by a product of the own-vehicle speed Vo and a certain time period T. The time period T may be set to an arbitrary value.

In step S503, a curve-exit side virtual curve setting process is performed. Thereafter, the flow proceeds to step S110. The vehicle control ECU 10 may thus be responsible for curve-exit side virtual curve setting means for executing this step S503. In the curve-exit side virtual curve setting process, a curve expressed by a set of x-coordinate X_out given by Eq. 15 and y-coordinate Y_out given by Eq. 16 with an origin that is set at an exit point of the virtual curve is defined as a curve-exit side virtual curve.

$$X\_out = \underbrace{A \times \sqrt{2 \times \tau} \times \left(1 - \frac{1}{2! \times 5} \times \tau^2 + \frac{1}{4! \times 9} \times \tau^4 - \frac{1}{6! \times 13} \times \tau^6 + \ldots \right)}_{\text{first term}} \quad (15)$$

$$+ \underbrace{\sqrt{\frac{D^2 + L^2}{2 \times L} \times 2 \times L - L^2} \times \cos\tau}_{\text{second term}} - \underbrace{D\_out}_{\text{third term}}$$

The first term in Eq. 15 is an X-direction component of a defining equation of a clothoid curve. The second term in Eq. 15 is a correction term for an X-direction distance calculated from a tire turning angle when traveling along the clothoid curve. The third term in Eq. 15 is a correction term for setting the exit point of the virtual curve to the origin of the 2D coordinate system.

$$Y\_out = \underbrace{A \times \tau \times \sqrt{2 \times \tau} \times \left(\frac{1}{3} - \frac{1}{3! \times 7} \times \tau^2 + \frac{1}{5! \times 11} \times \tau^4 - \frac{1}{7! \times 15} \times \tau^6 + \ldots \right)}_{\text{first term}} + \quad (16)$$

$$\underbrace{\sqrt{\frac{D^2 + L^2}{2 \times L} \times 2 \times L - L^2} \times \sin\tau}_{\text{second term}}$$

The first term in Eq. 16 is a Y-direction component of the defining equation of the clothoid curve. The second term in Eq. 16 is a correction term for a Y-direction distance calculated from the tire turning angle when traveling along the clothoid curve.

The parameter "A" is a constant given by Eq. 12. The parameter "τ" is a helix angle given by Eq. 13. The parameter "D" in Eq. 15 and Eq. 16 is a distance from the own vehicle to the curve-exit side virtual curve situated in front of the own vehicle (hereinafter referred to as a curve-exit side virtual curve distance D_trans_out). That is, D=D_trans_out.

Figure 19:
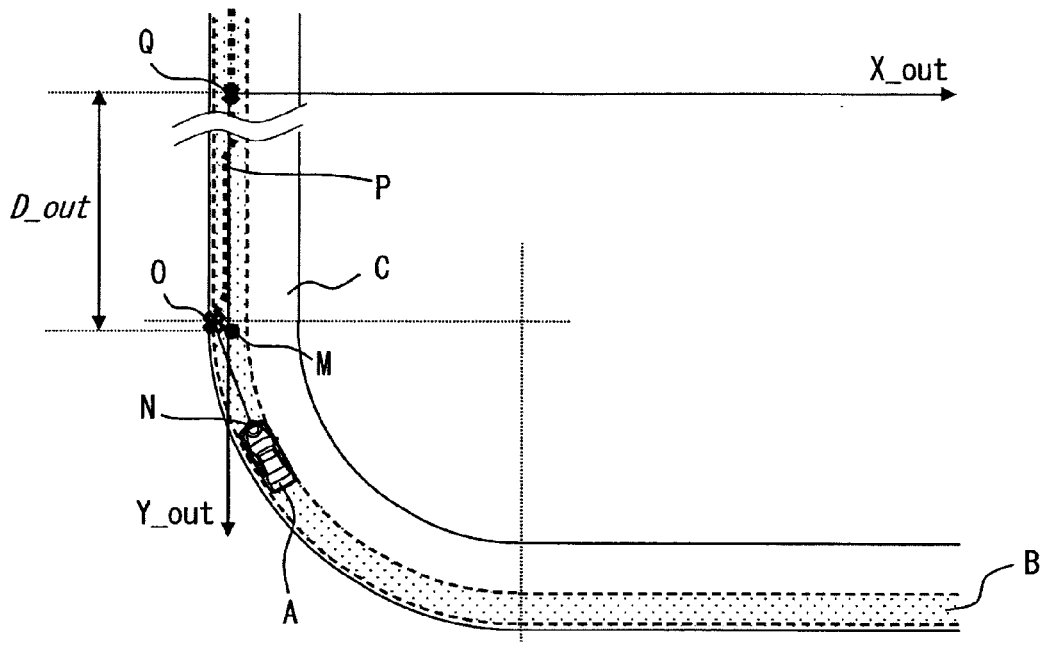
FIG. 19 shows an example of a curve-exit side start point, a curve-exit side end point, and curve-exit side virtual curve.

FIG. 19 shows an example of the curve-exit side start point, the curve-exit side end point, and the curve-exit side virtual curve. The symbol "M" in FIG. 19 represents the exit point, the symbol "N" the reverse steering initiation point, the symbol "O" the curve-exit side start point, the dotted line "P" the curve-exit side virtual curve, and the symbol "Q" the curve-exit side end point.

Figure 20:
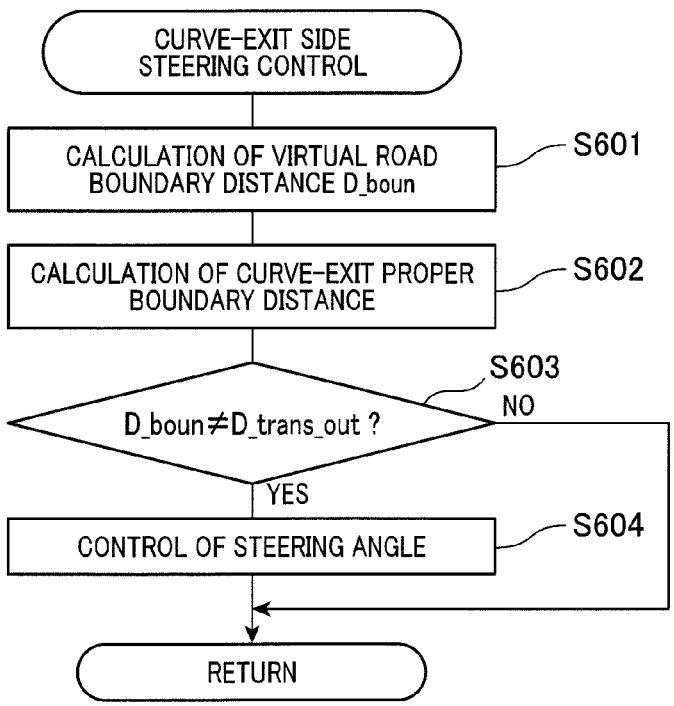
FIG. 20 shows a flowchart of a curve-exit side steering control process.

Referring back to FIG. 4, in step S110, a curve-exit side steering control process is performed, and then proceeds to step S111. There will now be explained the curve-exit side steering control process with reference to a flowchart of FIG. 20.

First, in step S601, a virtual-road boundary distance D_boun is calculated in a similar manner as in step S301. Thereafter, the flow proceeds to step S602, where a curve-exit proper boundary distance calculation process is performed. The flow then proceeds to step S603.

In the curve-exit side proper boundary distance calculation process, the curve-exit side virtual curve distance D_trans_out is calculated. The calculated curve-exit side virtual-road boundary distance D_trans_out is set as a proper boundary distance Dc. The vehicle control ECU 10 may thus be responsible for proper-distance calculation means for executing this step S602. The curve-exit side virtual-road boundary distance D_trans_out is a distance from the own vehicle (more specifically, the front end of the own vehicle) to a curve-exit side virtual curve situated in front of the own vehicle (see FIG. 21).

The curve-exit side virtual curve distance D_trans_out may be calculated, for example, by replacing the x- and y-coordinates (X_out, Y_out) of the curve-exit side virtual curve with the corresponding x- and y-coordinates in the above described two-dimensional coordinate system. Alternatively, the curve-exit side virtual curve distance D_trans_out may be calculated by replacing the current position of the own vehicle in the above described two-dimensional coordinate system with the corresponding coordinates in the (X_out, Y_out) coordinate system.

In step S603, a steering angle suitability determination process is performed. In the steering angle suitability determination process, the virtual-road boundary distance D_boun calculated in step S601 is compared with the curve-exit side virtual curve distance D_trans_out set as the proper boundary distance Dc in step S602.

If the virtual-road boundary distance D_boun is not equal to the proper boundary distance Dc (here, the curve-exit side virtual curve distance D_trans_out) (i.e., D_boun≠D_trans_out), then it is determined that the steering angle Θ is improper or unsuitable. Thereafter, the flow proceeds to step S604. If the virtual-road boundary distance D_boun is equal to the proper boundary distance Dc (i.e., D_boun=D_trans_out), then it is determined that the steering angle Θ is proper or suitable. Thereafter, the flow proceeds to step S111.

In step S604, steering angle control is conducted in a similar manner as in step S304 except that the curve-exit side virtual-road boundary distance D_trans_out is used as the proper boundary distance Dc. Thereafter, the flow proceeds to step S111.

In step S111, it is determined whether or not the end point of the curve-exit transition area is reached. As an example, if a distance between the current position of the own vehicle and the end point of the curve-exit transition area is larger than zero, then it is determined that the end point of the curve-exit transition area has not been reached yet. If the distance between the current position of the own vehicle and the end point of the curve-exit transition area is equal to or less than zero, then it is determined that the end point of the curve-exit transition area has been reached.

If it is determined in step S111 that the end point of the curve-exit transition area is reached, then the flow is ended. If the end point of the curve-exit transition area has not been reached yet, then the flow returns to step 110 and will be repeated therefrom.

Figure 21:
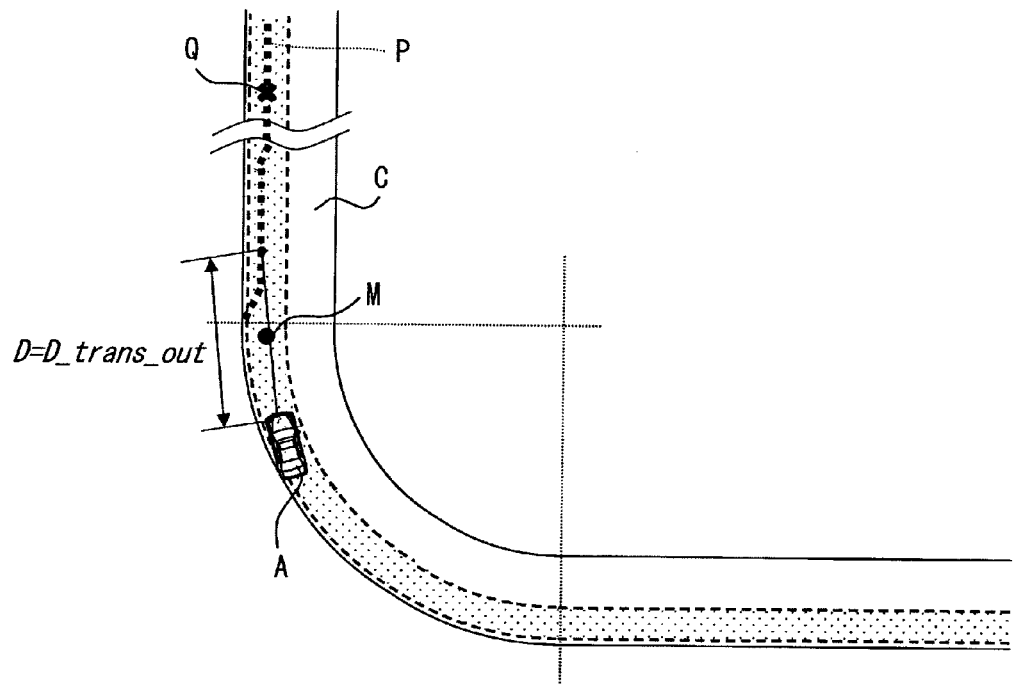
FIG. 21 shows an example of steering control on the basis of a curve-exit side virtual road boundary distance D_trans_out.
Figure 22:
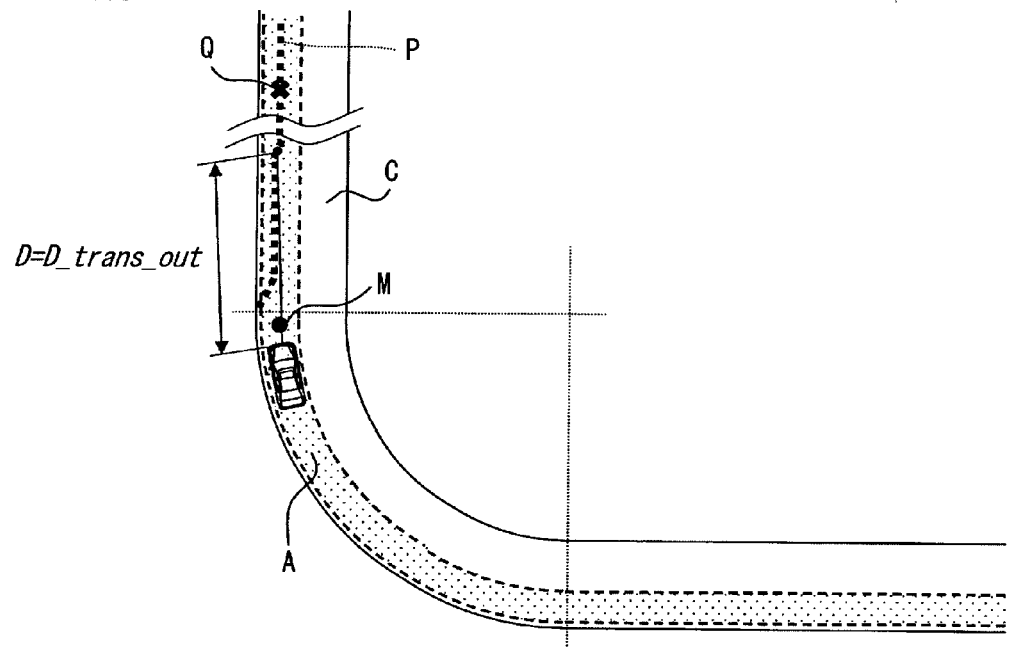
FIG. 22 shows an example of steering control on the basis of a curve-exit side virtual road boundary distance D_trans_out.
Figure 23:
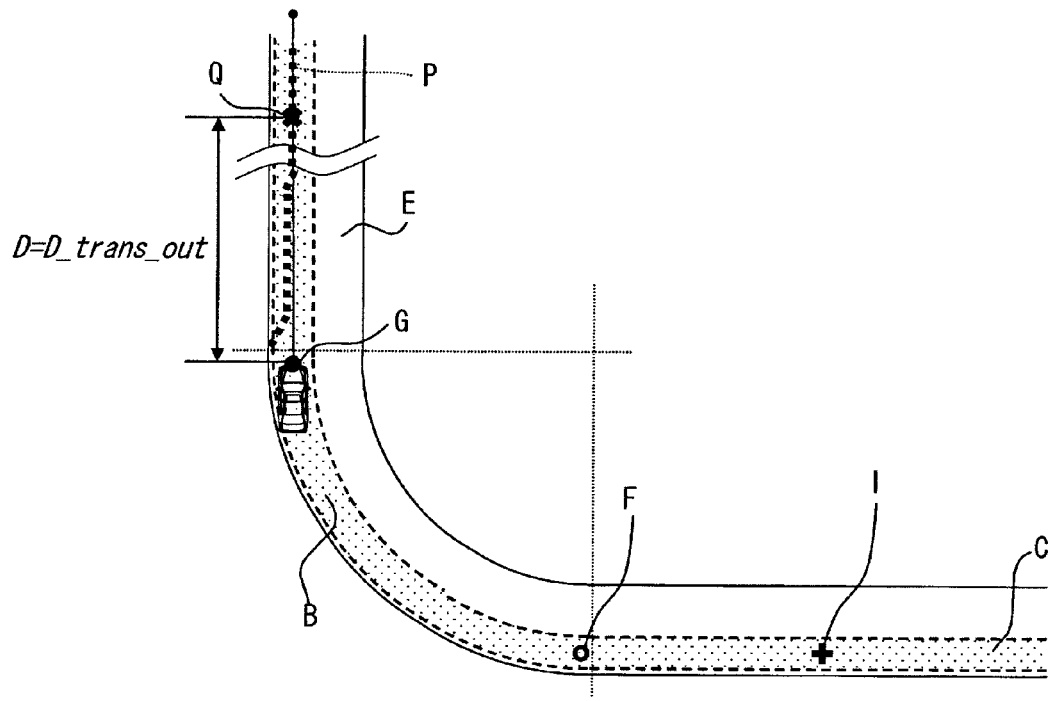
FIG. 23 shows an example of steering control on the basis of a curve-exit side virtual road boundary distance D_trans_out.

In the curve-exit transition area, as shown in FIG. 21, FIG. 22, FIG. 23, the steering angle is automatically changed so that the virtual-road boundary distance D_boun becomes equal to the curve-exit side virtual curve distance D_trans_out (i.e., D_boun=D_trans_out). This allows the own vehicle to travel while automatically changing the steering angle smoothly during traveling in the curve-exit transition area.

Figure 4:
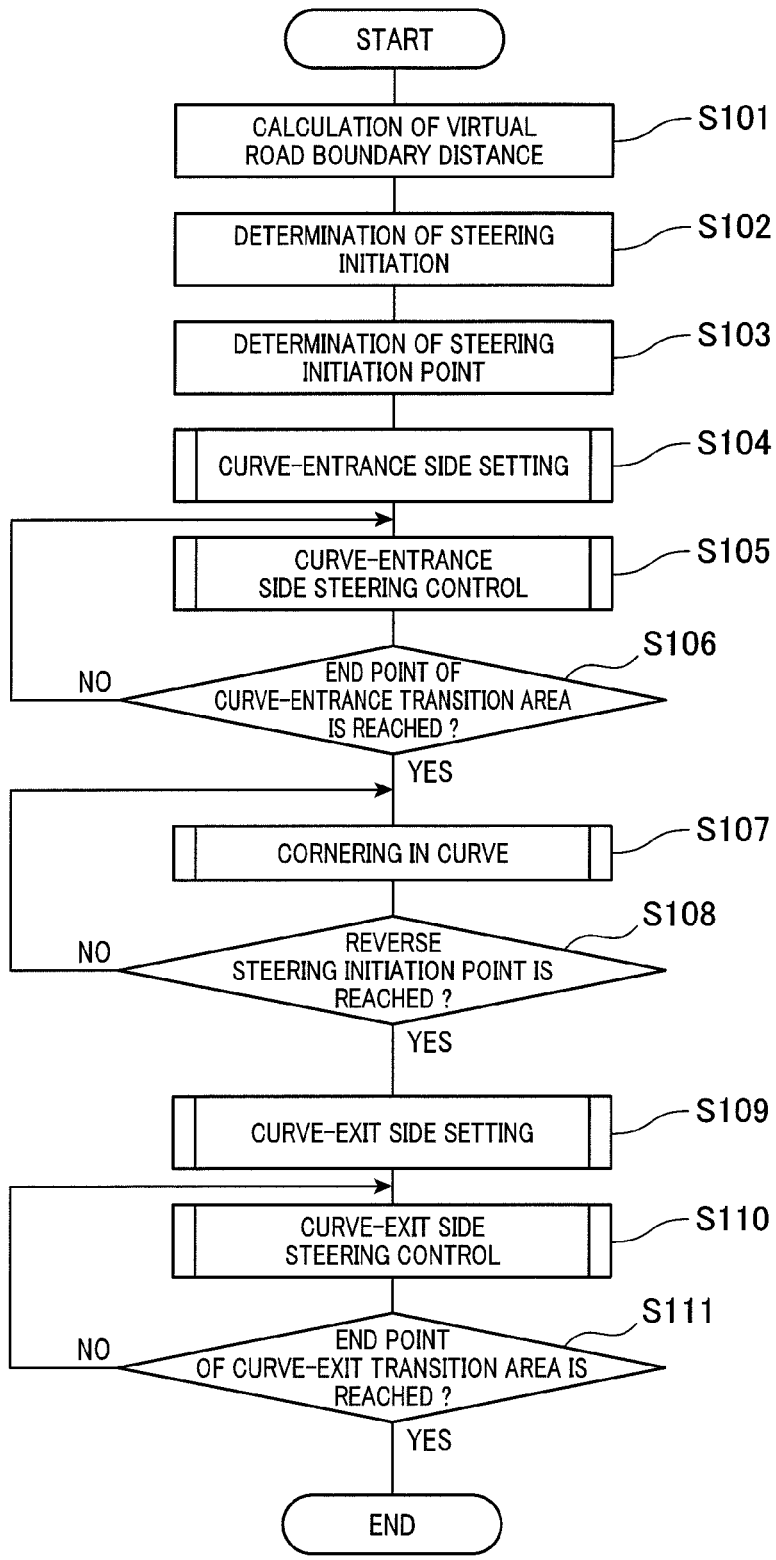
FIG. 4 shows a flowchart of a steering angle control related process.

After the end point of the curve-exit transition area is reached, the own vehicle will travel without steering. The flow of FIG. 4 is restarted when it is determined in the curve determination process that another curve lies in front of the own vehicle.

There will now be explained operations and benefits of the present embodiment with reference to FIGS. 24-33. The solid line S in FIG. 24 represents a change in steering angle Θ over travel distance of the own vehicle when steering of the own vehicle is controlled by the vehicle control ECU 10 during traveling along the virtual curve.

Figure 24:
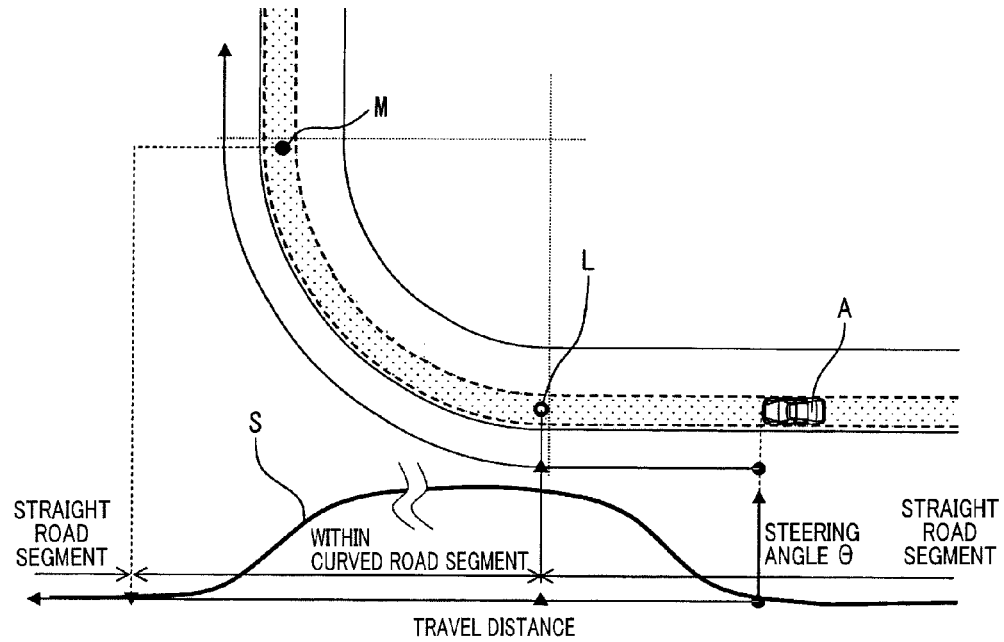
FIG. 24 shows operations and benefits of the first embodiment.

As shown in FIG. 24, in the steering angle control conducted in the vehicle control ECU 10 of the present embodiment, the steering angle Θ is changed or altered so that the travel path of the own vehicle draws a relaxation curve (the clothoid curve in the present embodiment) during cornering in the curve-entrance transition area and/or during cornering in the curve-exit transition area, which allows the steering angle Θ to be changed smoothly as shown in FIG. 24.

In the present embodiment, the steering initiation point is determined as a function of a distance D_boun from the own vehicle (more specifically, the front end of the own vehicle) to a virtual-road boundary situated in front of the own vehicle. Alternatively, for example, the steering initiation point is determined as a function of a distance D_apr from the own vehicle (more specifically, the front end of the own vehicle) to an entrance point of the curve, where the distance D_apr may be used in Eq. 1 and Eq. 2 instead of the distance D_boun.

The configuration of the present embodiment allows the own vehicle to travel along an alternate sequence of right- and left-hand curves while more smoothly changing the steering angle. A scenario where the own vehicle travels along such an alternate sequence of right- and left-hand curves will be explained with reference to FIG. 25.

Figure 25:
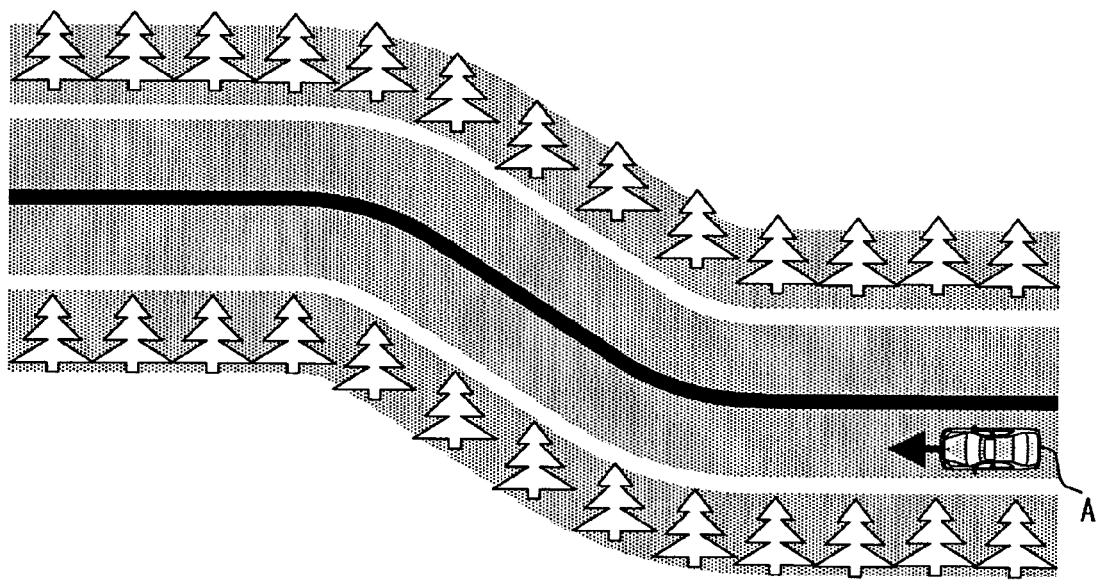
FIG. 25 shows an example of a sequence of right- and left-hand curves.

In an exemplary scenario as shown in FIG. 25 where the own vehicle is traveling along a sequence of right- and left-hand curves (right-hand curve to left-hand curve), there is an area where the road boundary in front of the own vehicle is changed from the outer boundary of the right-hand curve (boundary on the left side of the own vehicle) to the outer boundary of the subsequent left-hand curve (boundary on the right side of the own vehicle) even during the own vehicle turning along the right-hand curve (see FIG. 26A through FIG. 26D).

Figure 26A:
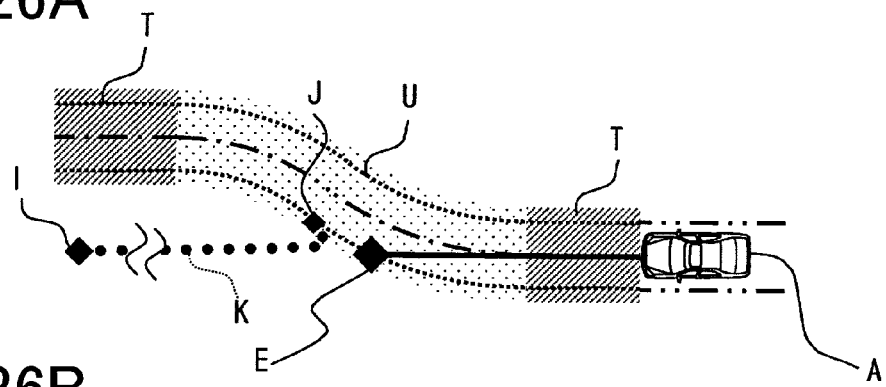
FIG. 26A though 26D show a problem that arises when the own vehicle travels along a sequence of right- and left-hand curves.
Figure 26B:
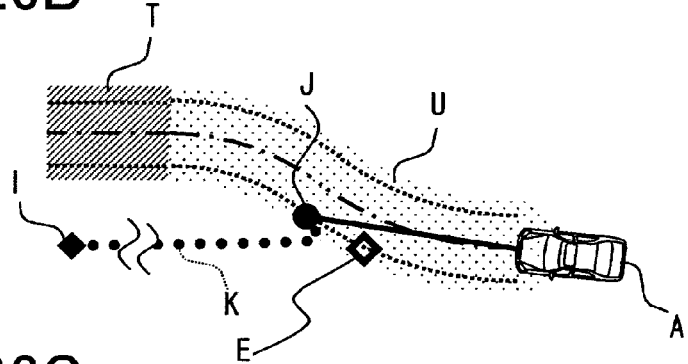
Figure 26C:
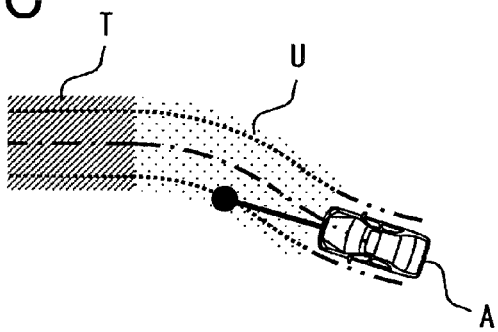
Figure 26D:
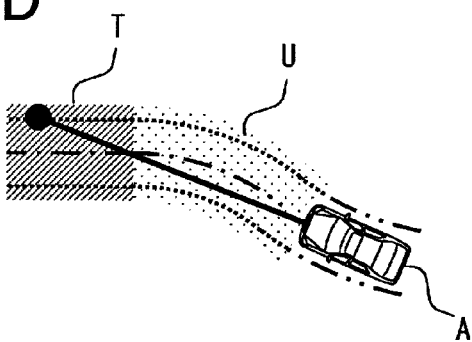

FIG. 26A through FIG. 26C show a situation where the road boundary in front of the own vehicle is the outer boundary of the right-hand curve. FIG. 26D shows a situation where the road boundary in front of the own vehicle is the outer boundary of the left-hand curve. FIG. 26A, FIG. 26B, FIG. 26C, and FIG. 26D are ordered in time in this order. In FIGS. 26A through 26D, the symbol "T" represents a straight road segment, the symbol "U" a sequence of right- and left-hand curved road segments, the dashed-dotted line a centerline of the virtual road outline, and the right and left dashed lines right and left virtual-road boundaries, respectively.

In an area (hereinafter referred to as an inflection area) where the road boundary situated in front of the own vehicle is changed from the outer boundary of the right-hand curve to the outer boundary of the left-hand curve following the right-hand curve, the virtual-road boundary distance D_boun that is a distance from the own vehicle to the road boundary situated in front of the own vehicle will increase abruptly. Given such a definition of the virtual-road boundary distance D_boun, setting an optimal boundary distance Dc to a distance from the front end of the own vehicle to a road boundary of a curve situated in front of the front end of the own vehicle during traveling along a circular path of a proper curvature radius in the curve will raise the following problem.

More specifically, the virtual-road boundary distance D_boun may change abruptly, while the optimal boundary distance Dc doesn't change abruptly during the own vehicle traveling along the right-hand curve. This may lead not only to an abrupt change in automatically controlled steering angle, but also to wrong steering in an opposite direction to a turning direction of the curve where the own vehicle is currently present.

Such a problem may also occur in cases where the own vehicle travels along an alternate sequence of right- and left-hand curves without a short and straight road segment therebetween.

In contrast, with the configuration of the present embodiment, when the current road segment is a right- or left-hand curved road segment, the subsequent road segment is tentatively set to a straight road segment even when the subsequent road segment is actually the left- or right-hand curved road segment, and the straight road segment is extended until the own vehicle reaches the subsequent road segment.

Consequently, the virtual-road boundary distance D_boun may be changed from a virtual-road boundary distance D_boun for an outer boundary of the first right-hand curve to a virtual-road boundary distance D_boun for a boundary of the straight road segment connected to the outer boundary of the first right-hand curve (i.e., the left boundary of the straight road segment). This can prevent the virtual-road boundary distance D_boun from increasing abruptly.

Figure 27A:
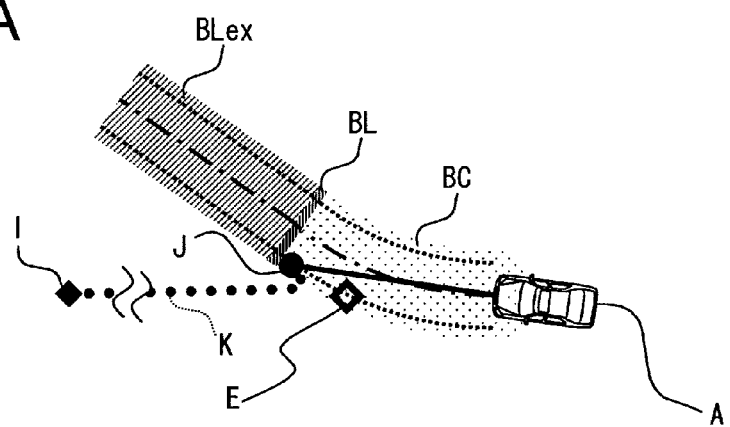
FIG. 27A though 27B show benefits when the own vehicle travels along a sequence of right- and left-hand curves in accordance with first embodiment.
Figure 27B:
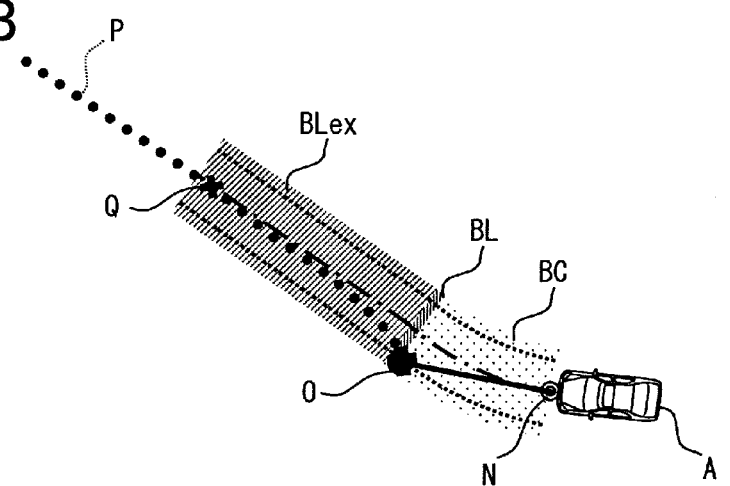

In addition, the tentatively set straight road segment or extended straight road segment allows creation of a smooth curve-entrance side virtual curve (see FIG. 27A) and a smooth curve-exit side virtual curve (see FIG. 27B). The automatic steering control is conducted on the basis of the optimal boundary distance Dc defined by a distance from the own vehicle to the virtual curve situated in front of the own vehicle, which allows the own vehicle to travel while changing the steering angle more smoothly. In FIGS. 27A, 27B, the symbol "BL" represents the straight road segment, the symbol "BLex" the extension of the straight road segment, and the symbol "BC" the curved road segment. In FIGS. 27A, 27B, the dashed-dotted line represents a centerline of the virtual road outline, and the right and left dashed lines the right and left virtual-road boundaries, respectively.

In addition, with the configuration of the present embodiment, the own vehicle is allowed to travel while changing the steering angle more smoothly, even when traveling along a short curved road segment connecting two straight road segments. There will now be explained an exemplary scenario, as shown in FIG. 28, where a first straight road segment and a second straight road segment are connected by a short curved road segment.

Figure 28:
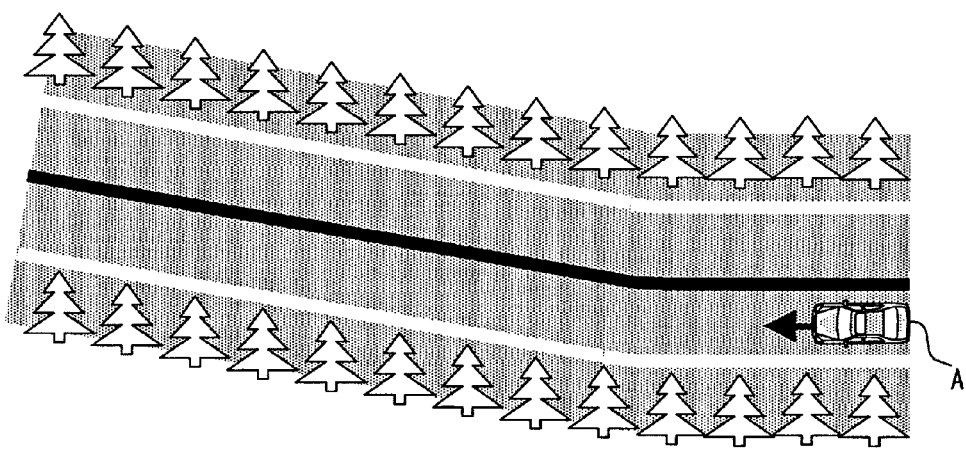
FIG. 28 shows an example travel path in which two straight road segments are connected by a short right-hand curve.
Figure 29A:
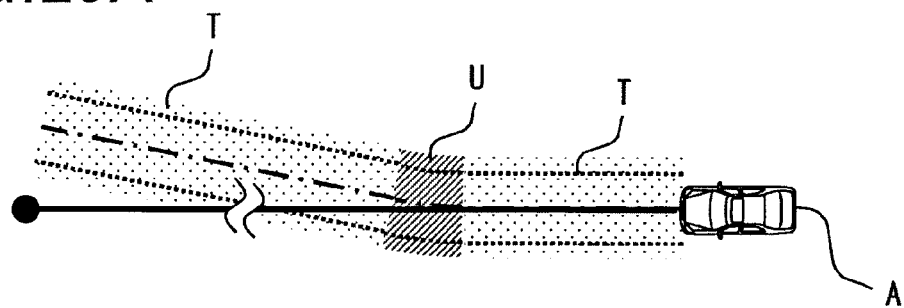
FIG. 29A through 29D show a problem that arises when two straight road segments are connected by a short right-hand curve.
Figure 29B:
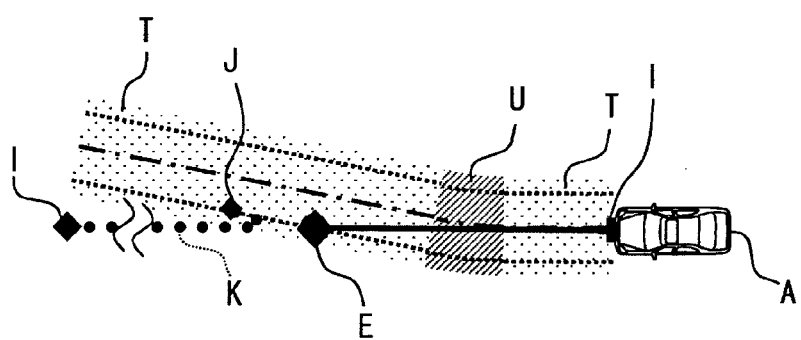
Figure 29C:
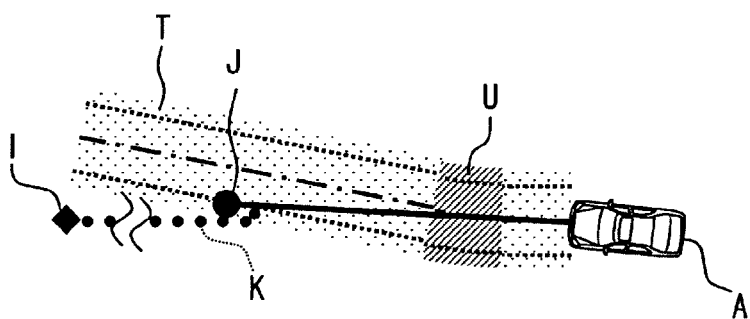

In a scenario as shown in FIG. 28 where the own vehicle is traveling along a travel path including a right-hand curve of a short length, when the own vehicle is approaching such a short right-hand curve as shown in FIGS. 29A through 29C, the virtual-road boundary of the right-hand curve is unable to be used for the automatic steering control. The virtual-road boundary distance D_boun will then be set to a distance from the own vehicle to a boundary of a straight road segment as the subsequent road segment to the short right-hand curve. Nonuse of the boundary of the right-hand curve for calculating the virtual-road boundary distance D_boun may prevent the steering control for turning along the right-hand curve from being conducted, which may raise a problem that suitable steering control may not be conducted for turning along the right-hand curve.

FIG. 29A, FIG. 29B, and FIG. 29C are ordered in time in this order. In FIGS. 29A through 29C, the symbol "T" represents the straight road segment, and the symbol "U" the short curved road segment. In FIGS. 29A through 29C, the dashed-dotted line represents a centerline of the virtual road outline, and the right and left dashed lines the right and left virtual-road boundaries, respectively.

Figure 29D:
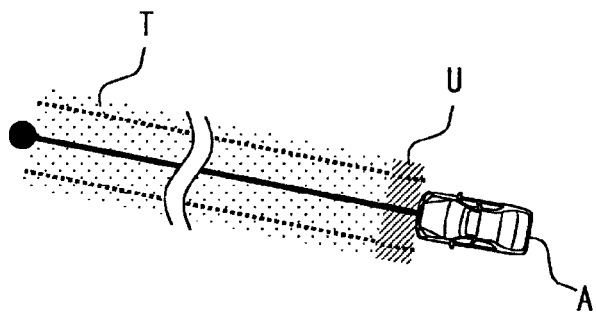

When the own vehicle has entered the short curved road segment, a distance from the own vehicle to a virtual-road boundary of the straight road segment may be defined as the virtual-road boundary distance D_boun, where the virtual-road boundary distance D_boun may be an infinite distance or a finite distance of hundreds of meters or more, as shown in FIG. 29D. This may prevent the suitable steering control from being conducted during cornering.

In contrast, with the configuration of the present embodiment, the short curved road segment as the subsequent road segment will be extended until the own vehicle reaches the curved road segment.

Figure 30A:
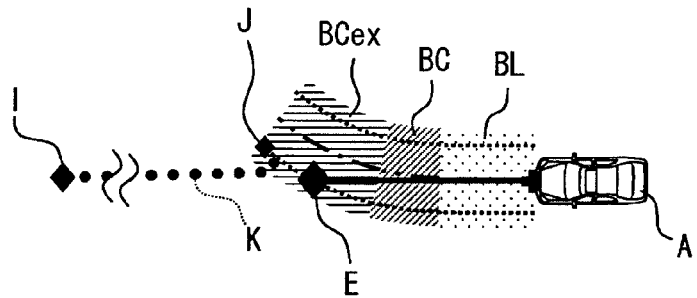
FIG. 30A through 30D show benefits when two straight road segments are connected by a short right-hand curve in accordance with the first embodiment.
Figure 30B:
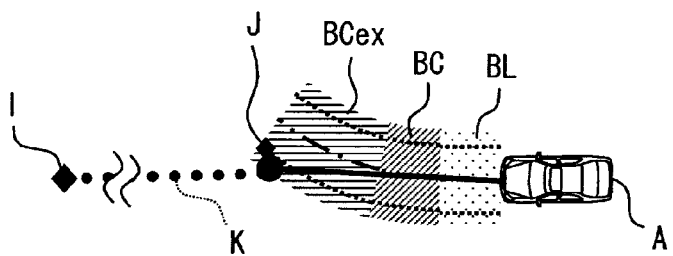
Figure 30C:
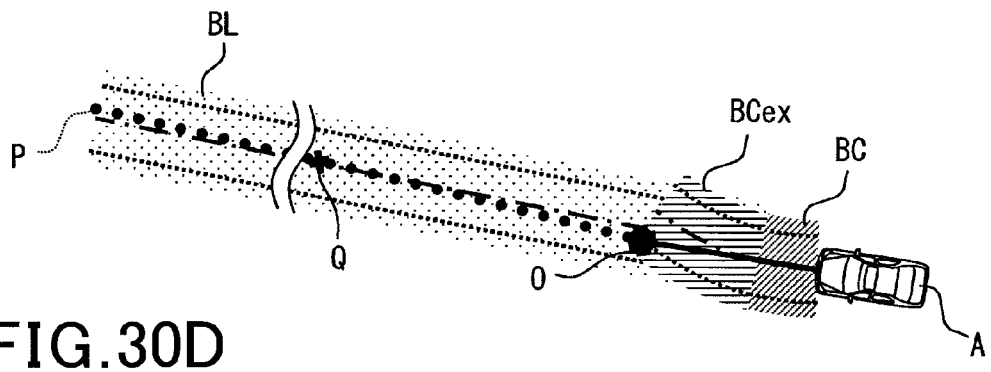
Figure 30D:
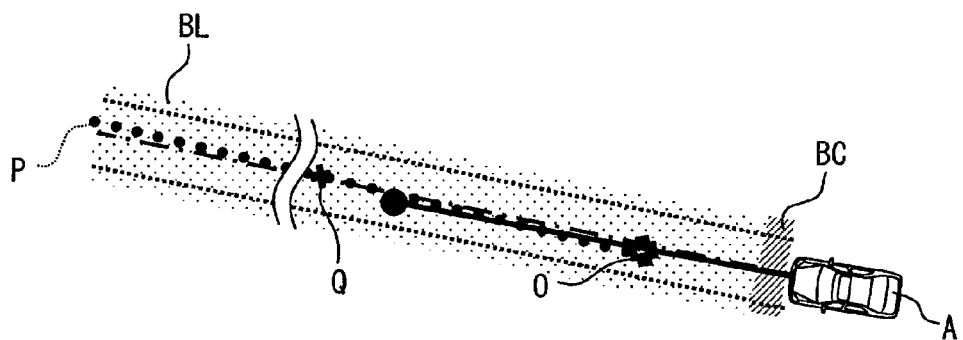

Accordingly, the tentatively set curved road segment (more specifically, the extended curved road segment) leads to creation of a smooth curve-entrance side virtual curve (see FIGS. 30A, 30B) and a smooth curve-exit side virtual curve (see FIGS. 30C, 30D). The automatic steering control is conducted on the basis of the optimal boundary distance Dc defined by a distance from the own vehicle to the virtual curve (the curve-entrance side virtual curve or the curve-exit side virtual curve), which allows the own vehicle to travel along the travel path as shown in FIG. 28 while changing the steering angle more smoothly.

FIG. 30A, FIG. 30B, FIG. 30C, and FIG. 30D are ordered in time in this order. In FIGS. 30A through 30D, the symbol "BL" represents the straight road segment, the symbol "BC" the curved road segment, and the symbol "BCex" the extension of the curved road segment. In FIGS. 30A through 30D, the dashed-dotted line represents a centerline of the virtual road outline, and the right and left dashed lines the right and left virtual-road boundaries, respectively.

Figure 31A:
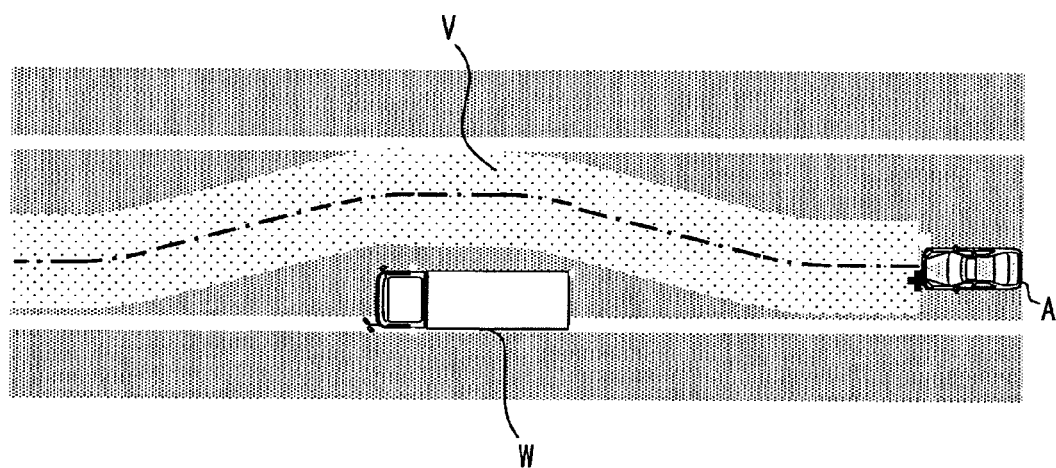
FIG. 31A through 31B show benefits when the own vehicle travels while avoiding a parked vehicle at a roadside in accordance with the first embodiment.
Figure 31B:
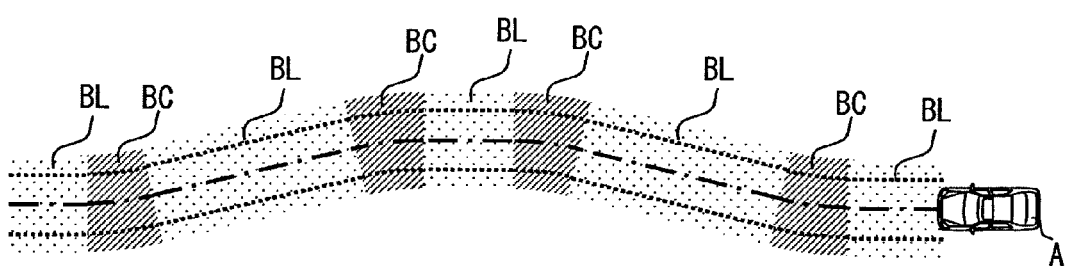

Further, with the configuration of the present embodiment, when a parked vehicle is present at a roadside as shown in FIG. 31A, a virtual road outline is determined such that the own vehicle can transition from a traveling lane to an overtaking lane (or an oncoming lane) and then return to the traveling lane to thereby avoid the parked vehicle. Such a virtual road outline is reconstructed as a sequence of road segments including straight road segments and curved road segments as shown in FIG. 31B. When a curve is present in front of the own vehicle, a virtual-road boundary distance D_boun is calculated. The own vehicle is allowed to avoid the parked vehicle while changing the steering angle more smoothly on the basis of the virtual-road boundary distance D_boun.

In FIG. 31A, the symbol "V" represents the virtual road outline, the symbol "W" the parked vehicle, and the dashed-dotted line a centerline of the virtual road outline. In FIG. 31B, the symbol "BL" represents the straight road segment, and the symbol "BC" the curved road segment.

Still further, in a scenario where a travel path along which the own vehicle will travel can be determined from recommended paths acquired from a navigation device 8, a virtual road outline may be determined so as to be adapted to the travel path, even when the own vehicle transitions from an acceleration lane to a traveling lane of a high-speed way or from the traveling lane to a side road. Also, the determined virtual road outline may be reconstructed as a sequence of road segments including straight road segments and curved road segments. When a curve is present in front of the own vehicle, a virtual-road boundary distance D_boun is calculated. The calculated virtual-road boundary distance D_boun allows the own vehicle to travel along the travel path automatically while changing the steering angle more smoothly in a similar manner as described above.

Figure 32A:
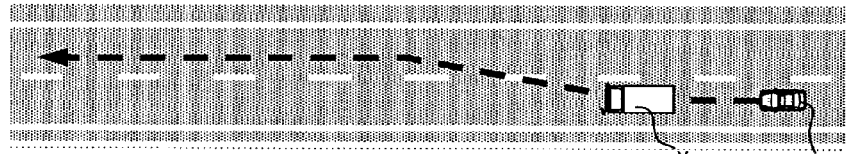
FIG. 32A through 32F shows an example of changing lanes to overtake a low speed vehicle.
Figure 32B:
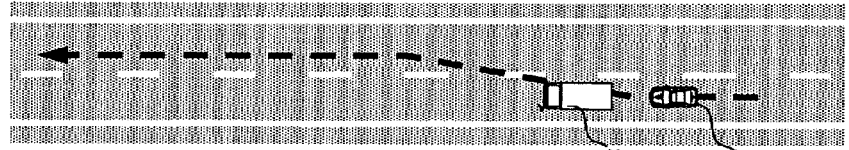
Figure 32C:
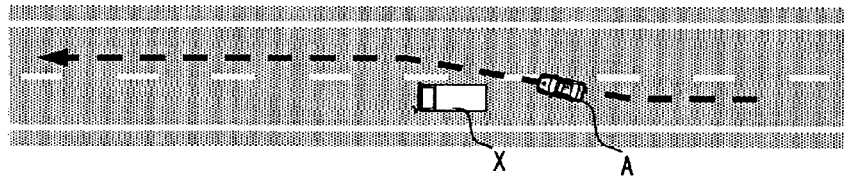
Figure 32D:
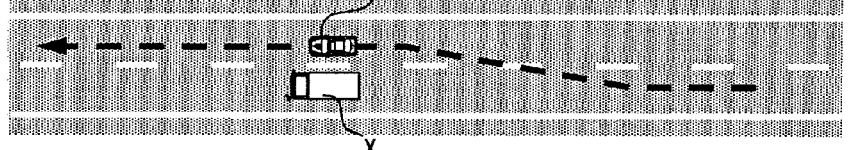
Figure 32E:
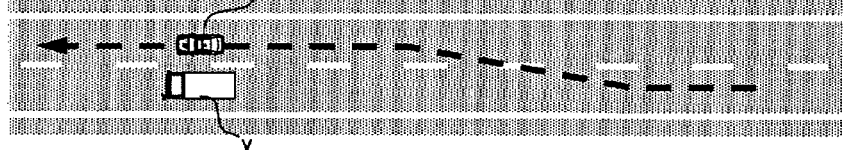
Figure 32F:
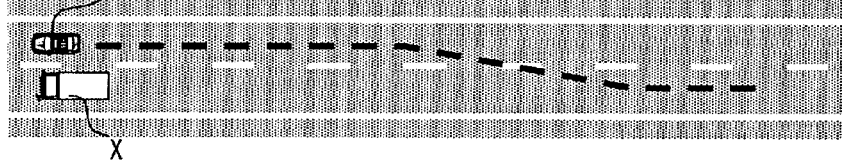
Figure 33:
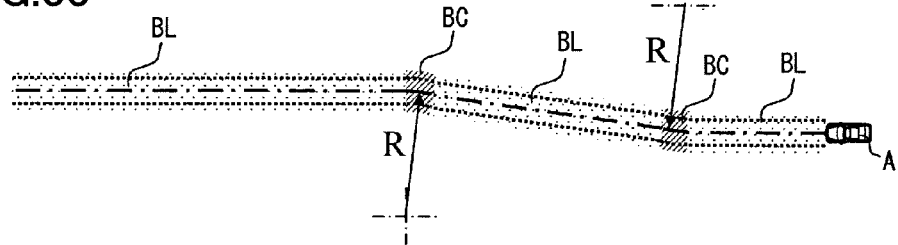
FIG. 33 shows an example of changing lanes to overtake a low speed vehicle.

Yet still further, in a scenario where the own vehicle is transitioning from a traveling lane to an overtaking lane for overtaking a preceding vehicle traveling at a lower speed than the own vehicle (see FIGS. 32A through 32F), a virtual road outline may be determined such that the own vehicle can transition from the traveling lane to the overtaking lane to thereby avoid the preceding vehicle. Also, as shown in FIG. 33, the virtual road outline may be reconstructed as a sequence of road segments including straight road segments, and curved road segments, as a curve along which the own vehicle can turn while experiencing a lateral G-force of 0.5 m/s$^2$ or the like. FIG. 32A, FIG. 32B, FIG. 32 C, FIG. 32D, FIG. 32E, and FIG. 32F are ordered in time in this order. In FIGS. 32A through 32F, the symbol "X" represents the lower speed preceding vehicle, the symbol "BL" the straight road segment, and the symbol "BC" the curved road segment.

Second Embodiment

There will now be explained a second embodiment of the present invention with reference to the accompanying drawings. Elements having the same functions as elements of the first embodiment as described above are assigned the same numbers and will not be described again for brevity.

Figure 34:
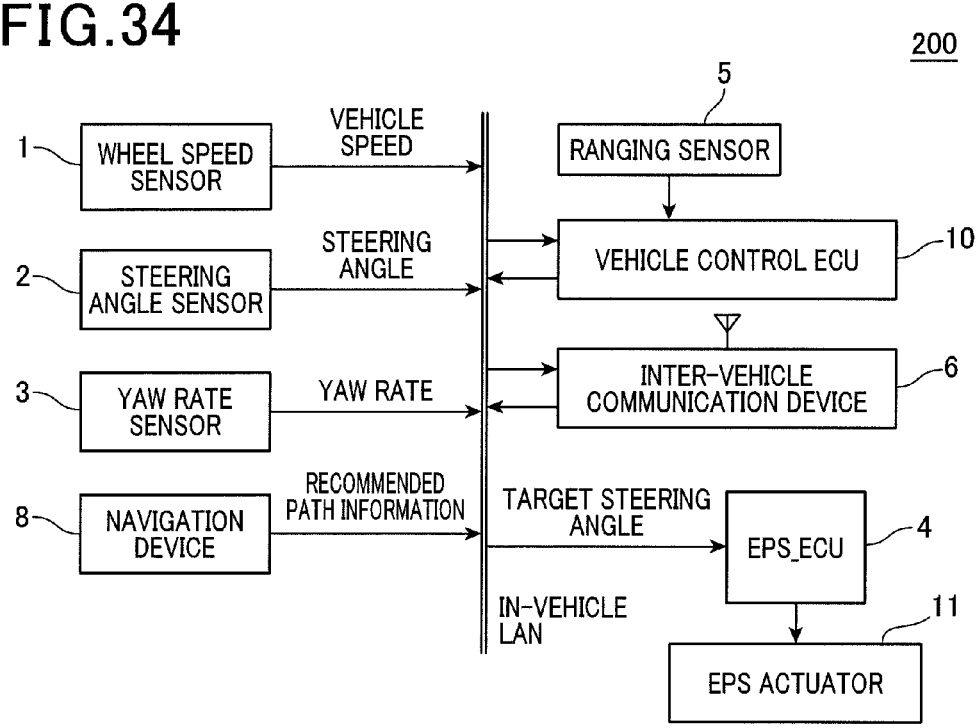
FIG. 34 shows a block diagram of a driving assistance system 200 in accordance with a second embodiment.

As shown in FIG. 34, a driving assistance system 200 of the second embodiment includes the wheel speed sensor 1, the steering angle sensor 2, the yaw rate sensor 3, EPS_ECU 4, the ranging sensor 5, an inter-vehicle communication device 6, the navigation device 8, and the vehicle control ECU 10, which are connected to each other via the in-vehicle LAN.

The driving assistance system 200 is similar to the driving assistance system 100 of the first embodiment except that the inter-vehicle communication device 6 for inter-vehicle communications is provided and the vehicle control ECU 10 is configured to determine a virtual road outline on the basis of vehicle information acquired from a preceding vehicle through inter-vehicle communications.

The inter-vehicle communication device 6 includes a transmitting and receiving antenna to transmit information regarding the own vehicle (hereinafter referred to as own-vehicle information) to other vehicles around the own vehicle and receive information regarding other vehicles around the own vehicle (hereinafter referred to as other-vehicle information) therefrom via inter-vehicle wireless communications without using telephone network communications. For example, wireless communications using 700-MHz radio waves allow the own vehicle to communicate with the other vehicles within a coverage of about 1 km radius around the own vehicle. Wireless communications using 5.9-GHz radio waves allow the own vehicle to communicate with the other vehicles within a coverage of about 500 m radius around the own vehicle.

The inter-vehicle communication device 6 transmits vehicle information, as the own-vehicle information, including, for example, an own-vehicle speed Vo and a steering angle Θ both acquired via the in-vehicle local area network (in-vehicle LAN) every predetermined time interval of 100 msec or the like. The inter-vehicle communication device 6 also receives vehicle information, as the other-vehicle information, transmitted from each of the other vehicles around the own vehicle via the inter-vehicle communication device 6 of the driving assistance system 200 mounted in the other vehicle. The inter-vehicle communication device 6 feeds the received vehicle information to the vehicle control ECU 10.

The vehicle control ECU 10 performs a travel path determination process to determine a travel path of a preceding vehicle on the basis of vehicle information (more specifically, a vehicle speed Vp and a steering angle Θ of the preceding vehicle) successively acquired via the inter-vehicle communication device 6. The vehicle control ECU 10 may thus be responsible for preceding vehicle information acquisition means.

As an example, a position of the own vehicle at a point in time is assumed to define an origin of a two-dimensional (2D) coordinate system. An initial position of the preceding vehicle is set at a position forward spaced apart from the origin by a distance as a function of a distance from the own vehicle to the preceding vehicle detected on the basis of a signal from the ranging sensor 5. The travel path of the preceding vehicle is determined by calculating a temporal sequence of travel points originating from the initial position on the basis of successively acquired vehicle speeds and steering angles Θ of the preceding vehicle.

On the basis of a time delay between the acquisition of the signal from the ranging sensor 5 for calculating the distance between the own vehicle and the preceding vehicle and the acquisition of the vehicle speed and the steering angle Θ of the preceding vehicle via the inter-vehicle communications and the acquired vehicle speed of the preceding vehicle, a distance traveled by the preceding vehicle for the time delay is estimated. The initial position of the preceding vehicle is determined by subtracting the estimated distance from a distance between the own vehicle and the preceding vehicle detected on the basis of the signal from the ranging sensor 5.

Thereafter, a travel distance from the initial position of the preceding vehicle followed by the own vehicle (also referred to as a followed preceding vehicle) is successively calculated on the basis of a transmission time interval of the vehicle speed and the steering angle Θ of the followed preceding vehicle via the inter-vehicle communications and the vehicle speed of the followed preceding vehicle, and a travel direction is calculated on the basis of the steering angle Θ of the followed preceding vehicle, which leads to a sequence of travel points. Alternatively, the origin of the 2D coordinate system may be set at any other point than the own vehicle positions.

The vehicle control ECU performs a road outline determination process to estimate a virtual road outline in front of the own vehicle, which originates from the current position of the own vehicle, on the basis of the travel path determined in the travel path determination process.

More specifically, the virtual road outline is estimated such that the virtual road outline is centered along the travel path (as a center line of the virtual road outline) determined in the travel path determination process and has a predetermined width that is a sum of right and left half widths around the travel path, each corresponding to a distance of 1.75 m. Alternatively, the right and left widths may be different from each other.

Still alternatively, outer boundaries of the road, which are laterally spaced apart from the travel path by a predetermined distance (for example, of 1.75 m), may define a virtual road outline.

After the virtual road outline is determined, a similar process will be performed as described in the first embodiment. The second embodiment is similar to the first embodiment except that the virtual road outline is determined on the basis of the vehicle information acquired via the inter-vehicle communications, which provides similar benefits as in the first embodiment.

In the present embodiment, the travel path of the preceding vehicle and the virtual road outline are determined on the basis of the vehicle information (including the speed and the steering angle of the followed preceding vehicle) acquired from the preceding vehicle via the inter-vehicle communications. Alternatively, for example, the vehicle control ECU 10 of the driving assistance system 200 of the followed preceding vehicle may determine the travel path of the preceding vehicle on the basis of the speed and the steering angle of the preceding vehicle to thereby determine the virtual road outline, and may thereafter transmit vehicle information including the determined travel path and virtual road outline. In such an embodiment, the vehicle control ECU 10 of the own vehicle does not have to determine the travel path of the preceding vehicle and the virtual road outline.

In the present embodiment, the travel path of the preceding vehicle and the virtual road outline are determined on the basis of the speed and the steering angle of the followed preceding vehicle. Alternatively, for example, the travel path of the preceding vehicle and the virtual road outline may be determined on the basis of a speed ratio of outer and inner wheels of the preceding vehicle.

More specifically, given the fact that angular speeds of the outer and inner wheels are equal to each other, a curvature radius of a curve may be calculated from the speed ratio of outer and inner wheels of the preceding vehicle by using a well-known formula, thereby determining the travel path of the preceding vehicle and the virtual road outline. Further, the entrance and exit points of the curve may be determined on the basis of the curvature radius of the curve. Since the outer and inner wheels are closer to the road surface than the steering wheel, the speed ratio of outer and inner wheels of the preceding vehicle advantageously leads to more accurate estimation of the curvature radius of the curve.

Further alternatively, the travel path of the preceding vehicle and the virtual road outline may be determined on the basis of a yaw rate of the preceding vehicle. Still further alternatively, the travel path of the preceding vehicle and the virtual road outline may be determined on the basis of the speed and the steering angle of the preceding vehicle, the speed ratio of outer and inner wheels of the preceding vehicle, and the yaw rate of the preceding vehicle. In such an embodiment, for example, the travel path of the preceding vehicle (and thus the virtual road outline) may be determined by averaging the travel paths of the preceding vehicle determined respectively on the basis of the speed and the steering angle of the preceding vehicle, the speed ratio of outer and inner wheels of the preceding vehicle, and the yaw rate of the preceding vehicle.

Third Embodiment

There will now be explained a third embodiment of the present invention with reference to the accompanying drawings. Elements having the same functions as elements of the first or second embodiment as described above are assigned the same numbers and will not be described again for brevity.

Figure 35:
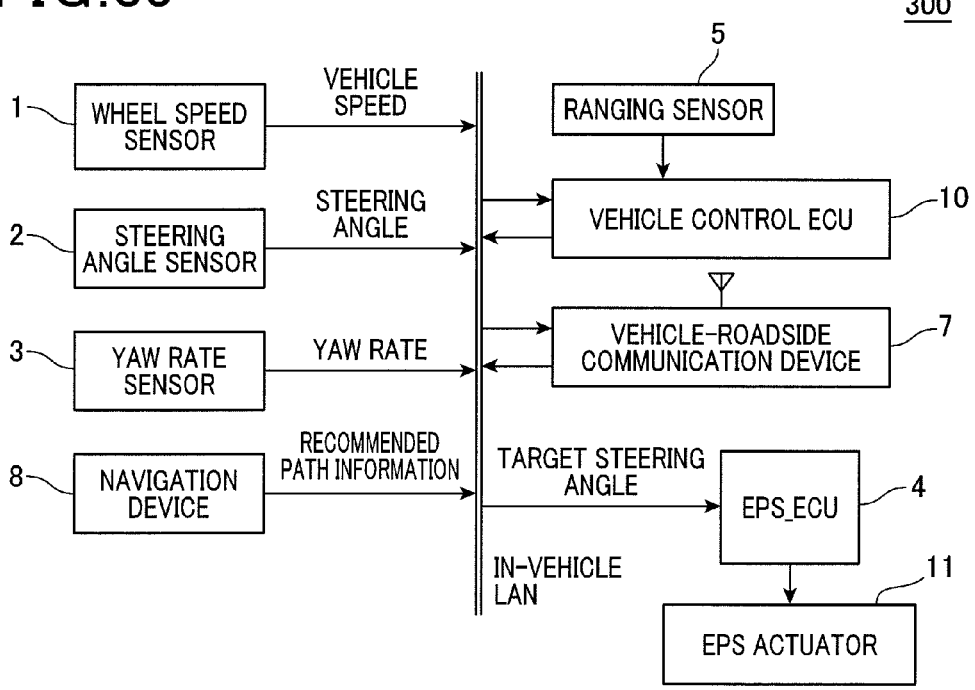
FIG. 35 shows a block diagram of a driving assistance system 300 in accordance with a third embodiment.

As shown in FIG. 35, a driving assistance system 300 of the third embodiment includes the wheel speed sensor 1, the steering angle sensor 2, the yaw rate sensor 3, the EPS_ECU 4, the ranging sensor 5, the vehicle-roadside communication device 7, the navigation device 8, and the vehicle control ECU 10.

The driving assistance system 300 is similar to the driving assistance system 100 of the first embodiment except that the vehicle-roadside communication device 7 for vehicle-roadside communications is provided and the vehicle control ECU 10 is configured to determine a virtual road outline on the basis of road outline determination information for determining a road outline acquired from a roadside device (not shown) via the vehicle-roadside communications.

The vehicle-roadside communication device 7 includes a transmitting and receiving antenna to receive road outline determination information from the roadside device. The roadside device 7 may be configured to transmit the road outline determination information in a zone of a radius of about hundreds of meters, for example, via 700-MHz radio wave wireless communications. Alternatively, the vehicle-roadside communication device 7 may be an optical beacon adapted to transmit the road outline determination information to a vehicle traveling in a specific lane.

The road outline determination information may be any information that allows the vehicle control ECU 10 to determine a virtual road outline of a drivable road region, which may include, for example, road alignment information including a location of a target intersection and indicative of a road alignment structure around the intersection. The road alignment information may be indicative of a location (latitude and longitude) of the target intersection as a positioning result from a satellite positioning system, a distance from the location of the target intersection to a specific structure changing point, and dimensions of road alignments and others.

Alternatively, the road outline determination information may include travel history information that is a collection of travel histories of a plurality of vehicles. The travel history information may be indicative of a history of vehicle speed and steering angle of each vehicle.

The vehicle control ECU 10 determines a virtual road outline of a drivable road region on the basis of the road outline determination information acquired via the vehicle-roadside communication device 7. After the virtual road outline is determined, similar processes will be performed as in the first embodiment. The vehicle control ECU 10 may thus be responsible for virtual-road-outline determination information acquisition means.

The third embodiment is similar to the first embodiment except that the virtual road outline is determined on the basis of the road outline determination information acquired via the vehicle-roadside communications, which provides similar benefits as in the first embodiment.

Fourth Embodiment

There will now be explained a fourth embodiment of the present invention with reference to the accompanying drawings. Elements having the same functions as elements of at least one of the first to third embodiments as described above are assigned the same numbers and will not be described again for brevity.

Figure 42:
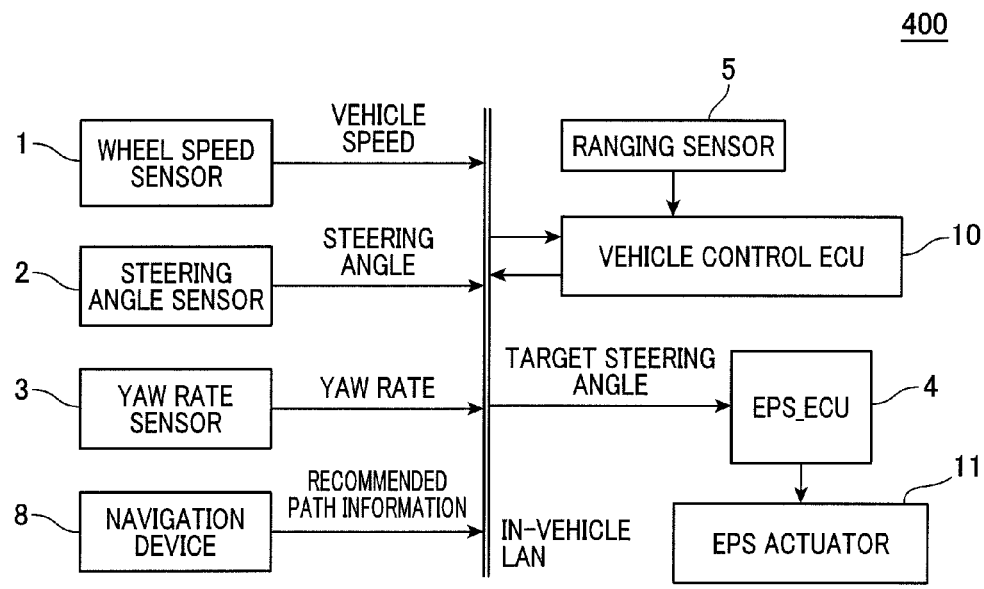
FIG. 42 shows a block diagram of a driving assistance system in accordance with a fourth embodiment.

The driving assistance system 400 of the fourth embodiment (see FIG. 42) is similar to the driving assistance system 100 of the first embodiment except that the vehicle control ECU 10 performs a steering angle correction process in addition to the steering angle control related process.

Figure 36A:
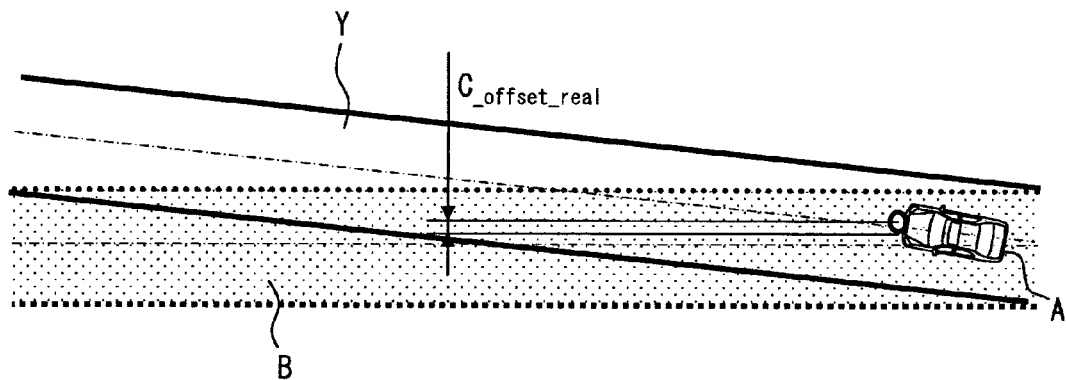
FIG. 36A through 36B show an example of steering angle correction of the own vehicle when the own vehicle is present in a straight road segment outside a curved road segment.

A vehicle control ECU 10 of the fourth embodiment is configured to, when the own vehicle is traveling in a straight road segment of the virtual road outline outside a curve, calculate a lateral deviation or distance (C_offset_real) by which the lateral center of the own vehicle is offset in the width direction of the straight road segment from the centerline of a real straight road (see FIG. 36A). The centerline is equidistant from both the boundaries of the real straight road.

The vehicle control ECU 10 detects positions of road boundaries and obstacles relative to the own vehicle on the basis of distance data of the road boundaries and obstacles acquired from the ranging sensor 5, and determines positions of boundaries of the real road as the detected positions (relative positions) of the road boundaries and obstacles. The vehicle control ECU 10 may thus be responsible for real-road boundary determination means.

Figure 36B:
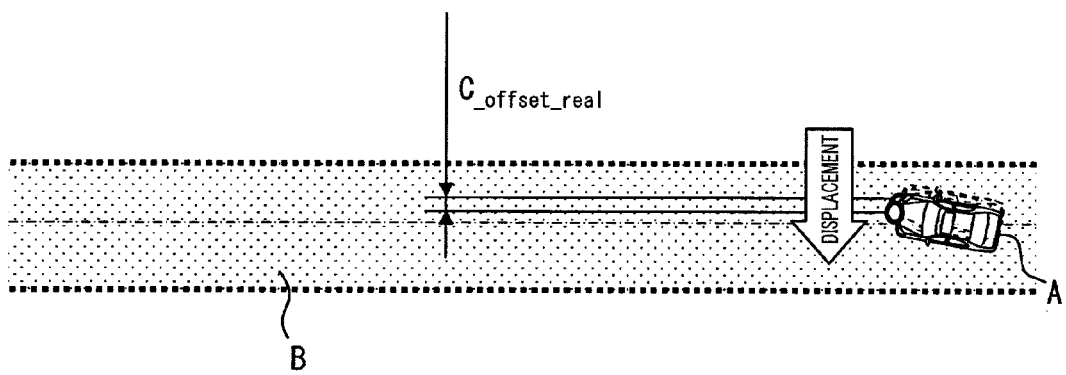

Subsequently, the position of the own vehicle on the straight road segment is laterally displaced (or translated) by the lateral deviation (C_offset_real) so as to lie on the centerline of the real straight road, thereby correcting the position of the own vehicle on the straight road segment (see FIG. 36B). The vehicle control ECU 10 may thus be responsible for lateral displacement means. The symbol "Y" in FIG. 36A represents a real road bordered by left and right real-road boundaries.

As described above, although the virtual road outline is determined from the detection results from the ranging sensor 5, the lateral displacement is performed by using the boundaries of the real road determined from the detection results from the ranging sensor 5, which leads to compensation for the error that has occurred during determining the virtual road outline.

When the own vehicle is traveling in a straight road segment of the virtual road outline outside a curve, the steering angle Θ required to bring the own vehicle back to the centerline between the boundaries of the straight road segment is derived from Eq. 6, Eq. 7, Eq. 8, and Eq. 9. The vehicle control ECU 10 may thus be responsible for steering angle correction means.

$$\Theta = N \times \theta\_c \quad (6)$$

Figure 37:
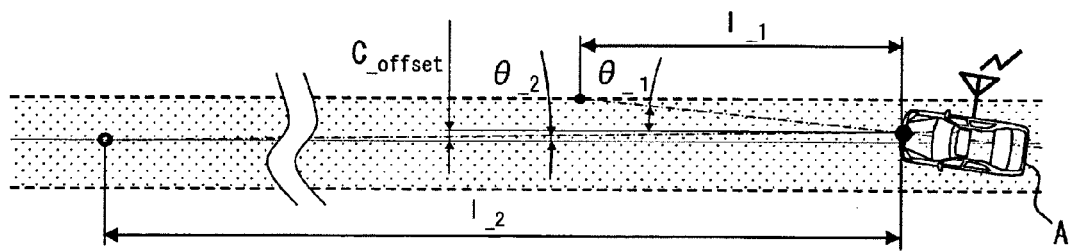
FIG. 37 shows an example of steering angle correction of the own vehicle when the own vehicle is present in a straight road segment outside a curved road segment.

The parameter N in Eq. 6 is a ratio (constant) of the steering angle Θ to the tire turning angle θ. θ_c in Eq. 6, which is defined by Eq. 7, is a tire turning angle that is required to bring the own vehicle back to the centerline between the boundaries of the straight road segment of the virtual road outline.

$$\theta\_c = \theta\_1 + \theta\_2 \quad (7)$$

θ_1 in Eq. 7, which is defined by Eq. 8, is a tire turning angle required to set an angle between the traveling direction of the own vehicle and the centerline of the straight road segment of the virtual road outline to zero (see FIG. 37). The centerline of the straight road segment is equidistant from both the boundaries of the straight road segment. θ_2 in Eq. 7, which is defined by Eq. 9, is a tire turning angle required to set an lateral deviation of the lateral center of the own vehicle from the centerline of the straight road segment of the virtual road outline to zero (see FIG. 37).

$$\theta\_1 = \sin^{-1}\left(\frac{L - C\_offset}{l\_1}\right) \quad (8)$$

$$\theta\_2 = \sin^{-1}\left(\frac{C\_offset}{l\_2}\right) \quad (9)$$

The parameter L in Eq. 8, as described above, is a lateral distance between the widthwise centerline of the own vehicle and the boundary of the virtual road outline. The parameter C_offset in Eqs. 8, 9 is an offset of the lateral center of the own vehicle from the centerline of the straight road segment of the virtual road outline (see FIG. 37). The centerline of the straight road segment is equidistant from both the boundaries of the virtual road outline. I_1 in Eq. 8 is a distance between the lateral center of the own vehicle and a portion of the boundary of the straight road segment situated in front of the own vehicle (see FIG. 37). I_2 in Eq. 9 is a distance defined by a product of the own-vehicle speed and a predetermined time period (T) (see FIG. 37).

As an example, when it is determined in the curve entering determination process that the own vehicle has not yet entered a curve or it is determined in the curve leaving determination process that the own vehicle has already left the curve, it may be determined that the own vehicle is traveling or situated in the straight road segment. In addition, when it is determined that the entrance point determined in the curve-entrance determination process is situated in front of the own vehicle or it is determined that the own vehicle is situated forward of the exit point determined in the curve-exit determination process, it may be determined that the own vehicle is traveling or situated in the straight road segment of the virtual road outline outside the curve.

With this configuration, when the own vehicle is traveling in a straight road segment of the virtual road outline outside a curve, simple calculations made according to Eq. 6, Eq. 7, Eq. 8, and Eq. 9 allow the own vehicle to be brought back to the centerline between the boundaries of the straight road segment of the virtual road outline.

Figure 38A:
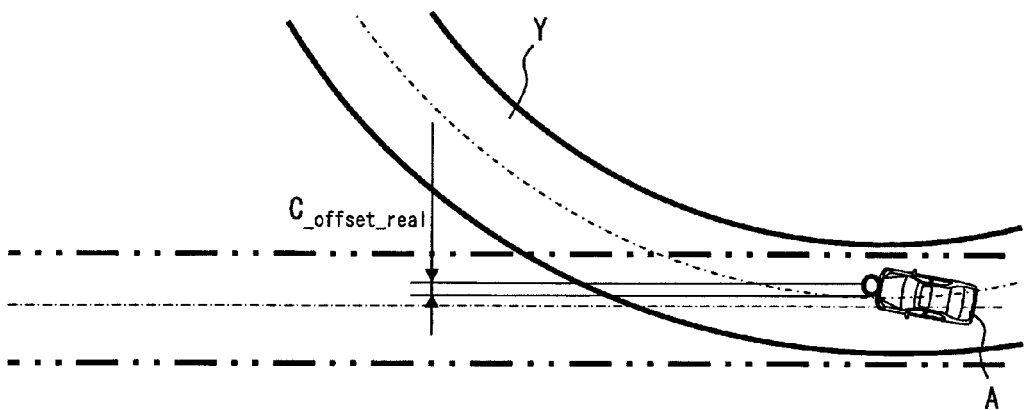
FIGS. 38A and 38B show shows an example of steering angle correction of the own vehicle when the own vehicle is present in a curved road segment.

In the present embodiment, when the own vehicle is traveling in a curved road segment, the vehicle control ECU 10 calculates a lateral deviation or distance (C_offset_real) by which the lateral center of the own vehicle is offset in the width direction of the real curve from the centerline between the boundaries of the real curve (see FIG. 38A).

Figure 38B:
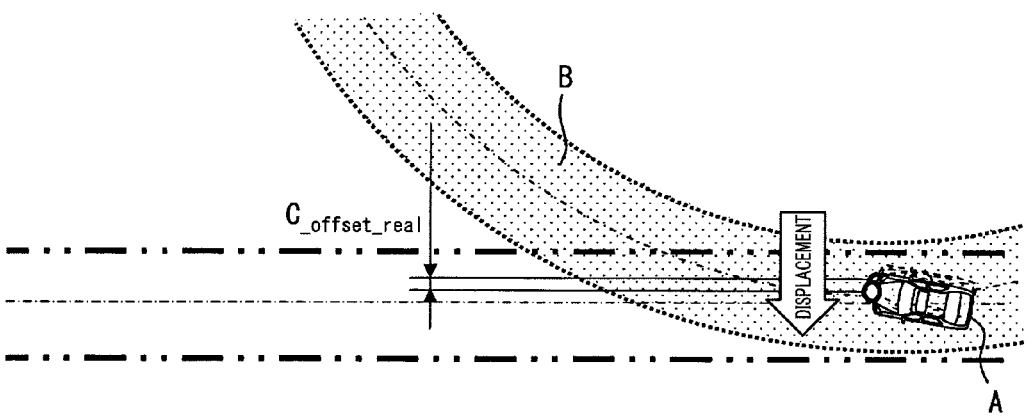

Subsequently, the position of the own vehicle in a straight road segment of the virtual road outline extending in the tangential direction to the boundaries of the curved road segment is laterally displaced by the lateral deviation (C_offset_real) so as to lie on the centerline of the real curve, thereby correcting the position of the own vehicle in the curved road segment of the virtual road outline (see FIG. 38B). Y in FIG. 38A represents a real curve bordered by real lines as real road boundaries. Long dashed double-dotted lines represent boundaries of the straight road segment of the virtual road outline extending in the tangential direction to the boundaries of the curved road segment.

In the present embodiment, when the own vehicle is traveling in a curved road segment, the vehicle control ECU 10 calculates the steering angle Θ required to bring the own vehicle back to the centerline of the straight road segment of the virtual road outline extending in the tangential direction to the boundaries of the curved road segment by using Eq. 6, Eq. 7, Eq. 8, and Eq. 9.

Figure 39:
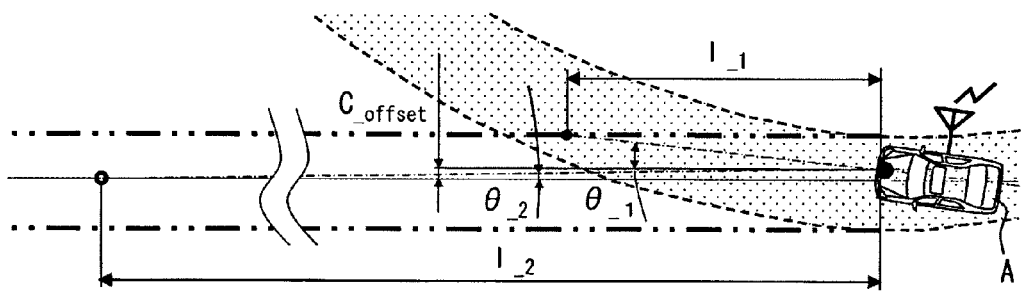
FIG. 39 shows an example of steering angle correction of the own vehicle when the own vehicle is present in a curved road segment.

The straight road segment of the virtual road outline extending in the tangential direction to the boundaries of the curved road segment is provided in the following manner. Intersection points of the boundaries of the curved segment (see the dashed lines in FIG. 39) with a line running through the front end of the own vehicle in the vehicle width direction are determined. Subsequently, tangential lines running through the respective intersection points are drawn (see the long dashed double-dotted line in FIG. 39). An area between the tangential lines is defined as the straight road segment of the virtual road outline.

The tangential lines to the respective boundaries of the curved road segment may be boundaries of the straight road segment of the virtual road outline extending in the tangential direction to the boundaries of the curved road segment.

As an example, the own vehicle may be assumed to be situated in the curved segment of the virtual road outline during a time period from the timing at which it is determined that the vehicle has entered the curved road segment in the above curve entering determination process to the timing at which it is determined that the vehicle has left the curved road segment in the curve leaving determination process. Alternatively, the own vehicle may be assumed to be situated in the curved road segment when the own vehicle is situated forward of the entrance point determined in the curve-entrance determination process and backward of the exit point determined in the curve-exit determination process.

Owing to the simple calculations of Eq. 6, Eq. 7, Eq. 8, and Eq. 9 as described above, even when the own vehicle is situated in the curved road segment, the above configuration allows the own vehicle to be brought back to the centerline of the straight road segment of the virtual road outline extending in the tangential direction to the boundaries of the curved road segment. Bringing the own vehicle back to the centerline of the straight road segment of the virtual road outline extending in the tangential direction to the boundaries of the curved road segment allows the own vehicle to be brought back towards the centerline of the curved road segment of the virtual road outline.

The compensation for the steering angle Θ may be performed every time the steering angle control is performed as a result of the steering angle suitability determination process or may be performed every predetermined time period or every predetermined travelling distance.

Figure 40:
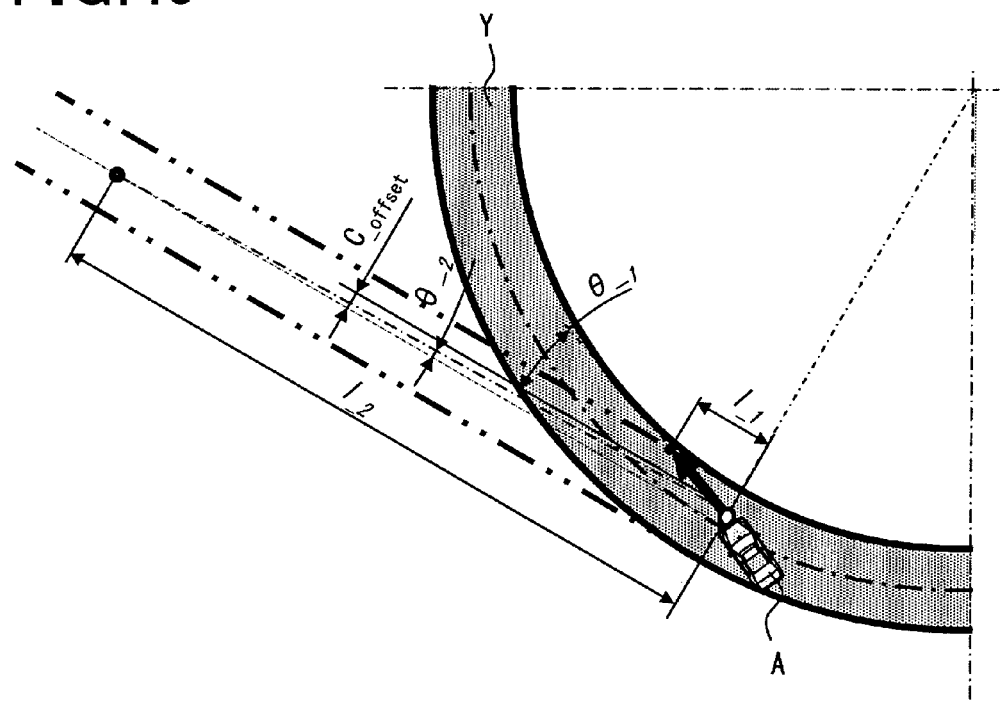
FIG. 40 shows a situation where the steering is still possible right before the own vehicle transitions to a spinning state due to oversteering.
Figure 41:
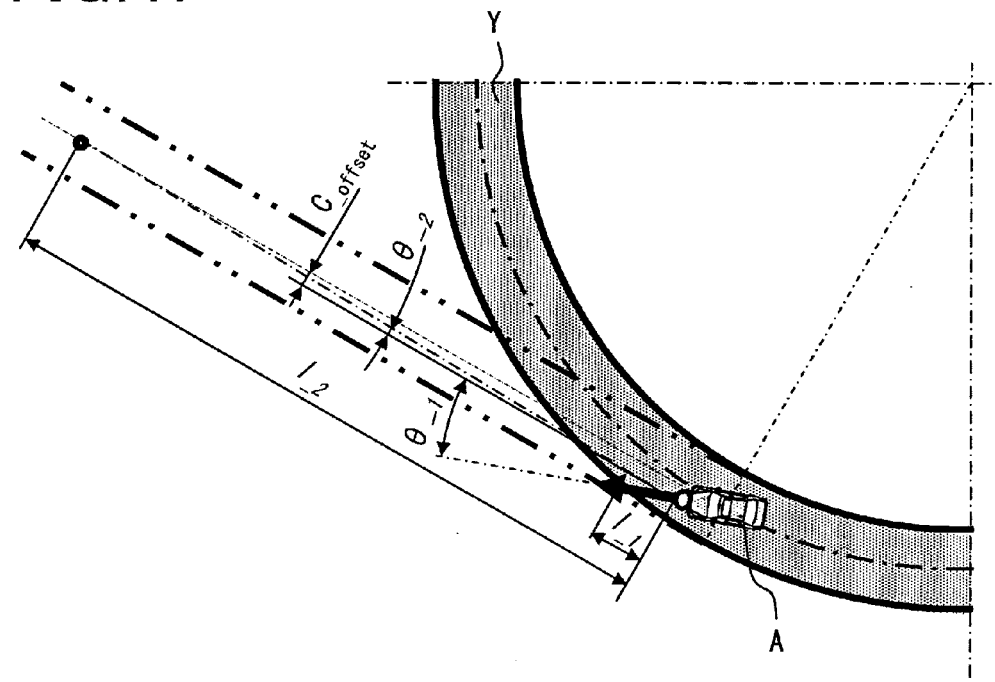
FIG. 41 shows a situation where the steering is still possible right before the own vehicle transitions to a spinning state due to understeering.

When the steering is still possible right before transitioning to a spinning state due to oversteering (see FIG. 40) or understeering (see FIG. 41) on a low friction (μ) road surface, the above configuration allows the own vehicle to be brought back towards the centerline of the curved segment and further to the centerline of the real road.

In some embodiments, the configuration of the fourth embodiment may be combined with at least one of the configurations of the second and third embodiments.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vehicle behavior control apparatus mounted in a vehicle, comprising:
a vehicle control electronic control unit (VCECU) configured to:
successively acquire detection results from a location sensor that successively detects a position of a boundary of a drivable road region situated in front of the vehicle;
successively acquire a current position of the vehicle;
determine a virtual road outline that is an outline of a drivable road region where the vehicle will travel on the basis of the successively acquired detection results from the location sensor;
reconstruct the determined virtual road outline as a sequence of road segments including straight road segments, right-hand curved road segments, and/or left-hand road segments;
when a current road segment where the vehicle is currently present is a right-hand or left-hand curved road segment, tentatively set a subsequent road segment where the vehicle will be present subsequent to the current road segment to a straight road segment until the vehicle reaches the subsequent road segment, even when the subsequent road segment is actually a left-hand or right-hand curved road segment;
on the basis of an acquired current position of the vehicle and a portion of the virtual road outline from the current road segment to the subsequent road segment, calculate a virtual-road boundary distance that is a distance from the vehicle to a boundary of the virtual road outline situated in front of the vehicle;
on the basis of the portion of the virtual road outline from the current road segment to the subsequent road segment, calculate a proper distance from the vehicle to the boundary of the virtual road outline situated in front of the vehicle, and
an electrical power steering electronic control unit (EPS-ECU) configured to control a steering angle so that the calculated virtual-road boundary distance is adapted to the calculated proper distance.

2. The apparatus of claim 1, wherein
the VCECU is further configured to, when the subsequent road segment is a straight road segment, tentatively set the subsequent road segment to an extended straight road segment that includes the straight road segment and its straight road extension, until the vehicle reaches the straight road segment as the subsequent road segment.

3. The apparatus of claim 1, wherein
the VCECU is further configured to, when the subsequent road segment is a curved road segment that is a right-hand curved road segment or a left-hand curved road segment, tentatively set the subsequent road segment to an extended curved road segment that includes the curved road segment and its curved road extension, until the vehicle reaches the curved road segment as the subsequent road segment.

4. The apparatus of claim 1, wherein
the VCECU is further configured to acquire information about a recommended path along which the vehicle will travel from a navigation device that searches for the recommended path, and
the VCECU is further configured to determine the virtual road outline by using the determined information about the recommended path along which the vehicle will travel as additional information.

5. The apparatus of claim 1, wherein
the VCECU is further configured to:
determine a steering initiation point as a function of the virtual-road boundary distance when the vehicle is present currently in a straight road segment as the current road segment followed by the right-hand or left-hand curved road segment as the subsequent road segment;
determine a point situated a predetermined distance or more away from the steering initiation point in the forward direction of the vehicle as a curve-entrance side start point that is a start point of a virtual curve for a curve-entrance transition area, the curve-entrance transition area extending from the steering initiation point in the straight road segment as the current road segment to a predetermined point in the curved road segment as the subsequent road segment, and the virtual curve for the curve-entrance transition area being here referred to as a curve-entrance side virtual curve;
set the curve-entrance side virtual curve such that the travel path of the vehicle draws a relaxation curve when the steering angle is controlled according to the proper distance that is a distance from the vehicle to the curve-entrance side virtual curve situated in front of the vehicle, the curve-entrance side virtual curve connecting the determined curve-entrance side start point and a curve-entrance side end point that is situated in front of the vehicle at the predetermined point; and while the vehicle is traveling in the curve-entrance transition area, calculate a distance from the vehicle to the curve-entrance side virtual curve situated in front of the vehicle as the proper distance.

6. The apparatus of claim 5, wherein the VCECU is further configured to:

calculate a steering initiation indicator KdB_e that is indicative of a status of the vehicle approaching the virtual-road boundary situated in front of the vehicle, which indicator is expressed as a function of a speed of the vehicle approaching the virtual-road boundary situated in front of the vehicle, the indicator KdB_e increasing with increasing approaching speed of the vehicle approaching the virtual-road boundary situated in front of the vehicle and the rate of increase in steering initiation indicator KdB_e with decreasing virtual-road boundary distance increasing more rapidly with decreasing virtual-road boundary distance;

determine whether or not a current value KdB_e_p of the steering initiation indicator is greater than a threshold KdB_e_str of the steering initiation indicator that is defined as a function of a distance from the vehicle to the virtual-road boundary situated in front of the vehicle;

when it is determined that the current value KdB_e_p of the steering initiation indicator is greater than the threshold KdB_e_str of the steering initiation indicator, initiate the steering of the vehicle; and when it is determined that the current value KdB_e_p of the steering initiation indicator is greater than the threshold KdB_e_str of the steering initiation indicator, determine an acquired current position of the vehicle as the steering initiation point.

7. The apparatus of claim 6, wherein the steering initiation indicator KdB_e is calculated using the following equation:

$$KdB\_e = 10 \times \log_{10}\left(\left|4 \times 10^7 \times \frac{Vo}{(D\_boun)^3}\right|\right)$$

where D_boun is the virtual-road boundary distance, and the threshold KdB_e_str for the steering initiation indicator is calculated using the following equation:

$$KdB\_e\_str = b \log_{10}(D\_boun) + c + \Delta c$$

where the parameters b, c are constants.

8. The apparatus of claim 1, wherein the VCECU is further configured to:

determine an exit point of a curved road segment as the current road segment on the basis of an outline of the curved road segment;

determine a position of the vehicle such that an intersection point of a virtual-road boundary of a right-hand or left-hand curved road segment as the current road segment and a virtual-road boundary of a straight road segment as the subsequent road segment is situated in front of the vehicle as a reverse steering initiation point;

determine the intersection point as a curve-exit side start point;

determine the exit point of the curved road segment as a steering termination point;

determine a point that is away from the determined exit point of the curved road segment by a distance as a function of a speed of the vehicle and that is situated along the widthwise centerline of a straight road segment situated forward of the determined exit point of the curved road segment as a curve-exit side end point;

set a curve-exit side virtual curve such that the travel path of the vehicle draws a relaxation curve when the steering angle is controlled according to the proper distance that is a distance from the vehicle to the curve-exit side virtual curve situated in front of the vehicle, the curve-exit side virtual curve connecting the determined curve-exit side start point and the determined curve-exit side end point; and while the vehicle is traveling in the curve-exit transition area, calculate a distance from the vehicle to the curve-exit side virtual curve situated in front of the vehicle as the proper distance.

9. The apparatus of claim 1, wherein the VCECU is further configured to:

calculate a tire turning angle $\theta$ required to adapt the virtual-road boundary distance to the proper distance; and calculate a steering angle $\Theta$ as a function of the tire turning angle, and the EPSECU is further configured to control the steering angle so as to be adapted to the calculated steering angle $\Theta$.

10. The apparatus of claim 9, wherein the VCECU is further configured to:

calculate an outer curvature radius Ra of a curve along which the vehicle is turning using the calculated proper distance and the following equation:

$$Ra = \frac{Dc^2 + L^2}{2 \times L}$$

where Dc is the calculated proper distance, and L is a lateral distance from the widthwise centerline of the vehicle extending in the vehicle longitudinal direction to the virtual-road boundary, thereafter calculate a tire turning angle $\theta$ using the estimated outer curvature radius Ra and the following equation:

$$\theta = \frac{180 \times WB}{\pi \times (Ra - L)}[deg]$$

where WB is a vehicle wheelbase, and calculate a target steering angle $\Theta$ using the tire turning angle $\theta$ and the following equation:

$$\Theta = N \times \theta$$

where N is a ratio of the steering angle $\Theta$ to the tire turning angle $\theta$.

11. The apparatus of claim 1, wherein the VCECU is further configured to:

determine boundaries of a real road on the basis of the successively acquired detection results from the location sensor;

when the vehicle is present in a straight road segment, displace the vehicle toward the centerline of the corresponding real straight road by a lateral deviation C_offset_real so that the lateral center of the vehicle lies on the centerline of the corresponding real straight road bordered by the determined boundaries, and when the vehicle is present in a right-hand or left-hand curved road segment, displace the vehicle by a lateral deviation C_offset_real so that the lateral center of the vehicle lies on the centerline of the corresponding real curve bordered by the determined boundaries; and on the basis of the straight road segment when the vehicle is present in the straight road segment or a straight road segment extending in the tangential direction to the boundaries of the curved road segment when the vehicle is present in the curved road segment, calculate a steering angle $\Theta$ required to bring the vehicle back to the centerline of the straight road segment, the steering angle $\Theta$ being derived from the following equations:

$$\Theta = N \times \theta\_c$$

where N is a ratio of the steering angle $\Theta$ to the tire turning angle $\theta$, and $\theta\_c$ is the tire turning angle that is required to bring the vehicle back to the centerline of the straight road segment, $$\theta\_c = \theta\_1 + \theta\_2$$

where $\theta\_1$ is a tire turning angle required to set an angle between the traveling direction of the vehicle and the centerline of the straight road segment to zero, and $\theta\_2$ is a tire turning angle required to set an lateral deviation of the lateral center of the vehicle from the centerline of the straight road segment to zero, $$\theta\_1 = \sin^{-1}\left(\frac{L - C\_offset}{l\_1}\right)$$

and $$\theta\_2 = \sin^{-1}\left(\frac{C\_offset}{l\_2}\right)$$

where L is a lateral distance between the widthwise centerline of the vehicle and the boundary of the virtual road outline, C_offset is an offset of the lateral center of the vehicle from the centerline of the straight road segment, 1_1 is a distance between the lateral center of the vehicle and a portion of the boundary of the straight road segment situated in front of the vehicle, and 1_2 is a distance defined by a product of a speed of the vehicle and a predetermined time period.

12. The apparatus of claim 5, wherein the relaxation curve is a clothoid curve.

13. The apparatus of claim 5, wherein an intersection point of the curve-entrance side virtual curve and an outer boundary of the curved road segment as the subsequent road segment is determined as the curve-entrance side end point.

14. A vehicle behavior control apparatus mounted in a vehicle, which acquires information via a communication device that transmits and receives information via inter-vehicle communications, the apparatus comprising:

a vehicle control electronic control unit (VCECU) configured to:

successively acquire a current position of the vehicle;

successively acquire preceding-vehicle information via the communication device, the preceding-vehicle information being information successively transmitted from an inter-vehicle communication enabled preceding vehicle and used to determine a virtual road outline that is an outline of a drivable road region where the vehicle will travel as a function of a travel path of the preceding vehicle;

determine the virtual road outline on the basis of the successively acquired preceding vehicle information;

reconstruct the determined virtual road outline as a sequence of road segments including straight road segments, right-hand curved road segments, and/or left-hand road segments;

when a current road segment where the vehicle is currently present is a right-hand or left-hand curved road segment, tentatively set a subsequent road segment where the vehicle will be present subsequent to the current road segment to a straight road segment until the vehicle reaches the subsequent road segment, even when the subsequent road segment is actually a left-hand or right-hand curved road segment;

on the basis of an acquired current position of the vehicle and a portion of the virtual road outline from the current road segment to the subsequent road segment, calculate a virtual-road boundary distance that is a distance from the vehicle to a boundary of the virtual road outline situated in front of the vehicle;

on the basis of the portion of the virtual road outline from the current road segment to the subsequent road segment, calculate a proper distance from the vehicle to the boundary of the virtual road outline situated in front of the vehicle, and an electrical power steering electronic control unit (EPS-ECU) configured to control a steering angle so that the calculated virtual-road boundary distance is adapted to the calculated proper distance.

15. A vehicle behavior control apparatus mounted in a vehicle and adapted to successively acquire, via a communication device, information transmitted from a roadside device via vehicle-roadside communications, the apparatus comprising:

a vehicle control electronic control unit (VCECU) configured to:

successively acquire a current position of the vehicle;

successively acquire virtual-road-outline determination information via the communication device, the virtual-road-outline determination information being information transmitted from the roadside device and used to determine a virtual road outline that is an outline of a drivable road region where the vehicle will travel;

determine the virtual road outline on the basis of the successively acquired virtual-road-outline determination information;

reconstruct the determined virtual road outline as a sequence of road segments including straight road segments, right-hand curved road segments, and/or left-hand road segments;

when a current road segment where the vehicle is currently present is a right-hand or left-hand curved road segment, tentatively set a subsequent road segment where the vehicle will be present subsequent to the current road segment to a straight road segment until the vehicle reaches the subsequent road segment, even when the subsequent road segment is actually a left-hand or right-hand curved road segment;

on the basis of an acquired current position of the vehicle and a portion of the virtual road outline from the current road segment to the subsequent road segment, calculate a virtual-road boundary distance that is a distance from the vehicle to a boundary of the virtual road outline situated in front of the vehicle;

on the basis of the portion of the virtual road outline from the current road segment to the subsequent road segment, calculate a proper distance from the vehicle to the boundary of the virtual road outline situated in front of the vehicle, and an electrical power steering electronic control unit (EPS-ECU) configured to control a steering angle so that the calculated virtual-road boundary distance is adapted to the calculated proper distance.

* * * * *